(12) United States Patent
Kusano et al.

(10) Patent No.: US 12,421,691 B2
(45) Date of Patent: Sep. 23, 2025

(54) MULTIPLE FAN COOLING WITH SPECIFIC BAFFLE ORIENTATION

(71) Applicant: HITACHI CONSTRUCTION MACHINERY CO., LTD., Tokyo (JP)

(72) Inventors: Kazuya Kusano, Tokyo (JP); Daisuke Kawaguchi, Tokyo (JP); Tomonori Mamada, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 189 days.

(21) Appl. No.: 18/025,218

(22) PCT Filed: Oct. 19, 2021

(86) PCT No.: PCT/JP2021/038629
§ 371 (c)(1),
(2) Date: Mar. 8, 2023

(87) PCT Pub. No.: WO2022/085685
PCT Pub. Date: Apr. 28, 2022

(65) Prior Publication Data
US 2023/0313492 A1 Oct. 5, 2023

(30) Foreign Application Priority Data

Oct. 20, 2020 (JP) .................................. 2020-175818

(51) Int. Cl.
*B60K 11/04* (2006.01)
*B60K 11/02* (2006.01)
(Continued)

(52) U.S. Cl.
CPC ............ *E02F 9/0866* (2013.01); *B60K 11/02* (2013.01); *E02F 9/226* (2013.01)

(58) Field of Classification Search
CPC ......... E02F 9/0866; E02F 9/226; B60K 11/02
See application file for complete search history.

(56) References Cited

U.S. PATENT DOCUMENTS

| 5,758,716 A * | 6/1998 | Shibata ................. F04D 29/541 |
| | | 165/41 |
| 2006/0254291 A1* | 11/2006 | Allen ........................ F01P 5/02 |
| | | 62/179 |
| 2015/0300238 A1 | 10/2015 | Ishikawa et al. |

FOREIGN PATENT DOCUMENTS

DE 102011006350 A1 10/2012
JP 2005-061308 A 3/2005
(Continued)

OTHER PUBLICATIONS

International Search Report of PCT/JP2021/038629 Jan. 11, 2022.
(Continued)

*Primary Examiner* — Gonzalo Laguarda
(74) *Attorney, Agent, or Firm* — Mattingly & Malur, PC

(57) ABSTRACT

A cooling device includes a casing having a peripheral wall, a plurality of heat exchangers disposed side by side so as to extend transversely in the casing, and a plurality of fans opposed to the plurality of heat exchangers. The casing has a plurality of baffles that extend from the heat exchanger group side toward the cooling fan group side in a space surrounded by the peripheral wall and is arrayed in an arrangement direction of the plurality of heat exchanges. A one side end portion of each baffle is positioned on a boundary between two mutually adjacent heat exchangers or on one of the heat exchangers. The fifth fan is disposed at such a position as to be opposed to one of the plurality of baffles, and other fans are disposed at a position between the peripheral wall and a baffle or between the plurality of baffles.

3 Claims, 20 Drawing Sheets

(51) Int. Cl.
 *E02F 9/08* (2006.01)
 *E02F 9/22* (2006.01)

(56) References Cited

FOREIGN PATENT DOCUMENTS

| | | |
|---|---|---|
| JP | 2006-241991 A | 9/2006 |
| JP | 2007-76602 A | 3/2007 |
| JP | 2008-223570 A | 9/2008 |
| JP | 2009-8024 A | 1/2009 |
| JP | 2014-34323 A | 2/2014 |
| JP | 2014-101870 A | 6/2014 |
| JP | 2016-30999 A | 3/2016 |
| JP | 2017-198135 A | 11/2017 |

OTHER PUBLICATIONS

International Preliminary Report on Patentability received in corresponding International Application No. PCT/JP2021/038629 dated May 4, 2023.
Extended European Search Report received in corresponding European Application No. 21882826.7 dated Sep. 11, 2024.

\* cited by examiner

COMPARATIVE EXAMPLE

MULTIPLE FAN COOLING WITH SPECIFIC BAFFLE ORIENTATION

TECHNICAL FIELD

The present invention relates to a cooling device for a construction machine, and more particularly to a cooling device for a construction machine that supplies cooling air generated by a single cooling fan or a plurality of cooling fans to a plurality of heat exchangers such as a radiator and an oil cooler.

BACKGROUND ART

In a construction machine such as a hydraulic excavator or a hydraulic crane, it is necessary to prevent overheating by appropriately exhausting heat generated by an engine, a hydraulic system, or the like to the outside of the machine body. To this end, the construction machine has incorporated therein a plurality of heat exchangers such as a radiator for cooling the engine with water, an oil cooler for cooling hydraulic operating fluid that is circulated in the hydraulic system, an intercooler for cooling air compressed by a supercharger, and the like.

In a construction machine, a plurality of cooling fans are used to supply cooling air to a plurality of heat exchangers (for example, refer to Patent Document 1). The heat exchanging apparatus disclosed in Patent Document 1 includes, in order to supply a required amount of air to the heat exchangers and reduce the fuel consumption amount and noise, a plurality of heat exchangers disposed in parallel to each other, a plurality of blowing means (cooling fans) individually disposed to be opposed to the respective heat exchangers, a plurality of electric driving sources for individually driving the respective pieces of blasting means (cooling fans), a plurality of temperature detection means for detecting the temperature of fluid that passes the heat exchangers, and control means for controlling the driving speed of the electric driving sources on the basis of the temperatures detected by the respective pieces of temperature detection means.

Further, in a construction machine, only one cooling fan is used to supply cooling air to all of a plurality of heat exchangers (for example, refer to Patent Document 2). In the construction machine disclosed in Patent Document 2, cooling air is introduced into the heat exchangers by driving of the single fan disposed on the downstream side of the heat exchangers in an engine room. The plurality of heat exchangers are provided so as to be in parallel to each other in a flowing direction of the air in the engine room, and a baffle is provided on the boundary between mutually adjacent ones of the heat exchangers over a predetermined range from the heat exchangers to the upstream side in the flowing direction of cooling air.

PRIOR ART DOCUMENT

Patent Documents

Patent Document 1: JP-2017-198135-A
Patent Document 2: JP-2007-76602-A

SUMMARY OF THE INVENTION

Problem to be Solved by the Invention

Incidentally, in a construction machine, in a case where exhaust heat amounts taken charge of by heat exchangers are much different from each other, in another case where the performances of individual heat exchangers are much different from each other, in a further case where various implements in the machine body are disposed at positions at which they become barriers against cooling air to be supplied to heat exchangers due to restrictions in the space or in a similar case, it is also supposed that air volumes necessary for the individual heat exchangers or suction forces of the heat exchangers are much different from each other.

In the heat exchanging apparatus disclosed in Patent Document 1, cooling air is supplied to the heat exchangers by the respective pieces of drafting means (cooling fans) individually different from each other. Accordingly, when the necessary air amount or the suction force is much different among the plurality of heat exchangers, a large amount of deviation in load occurs among the plurality of drafting means (cooling fans). If the loads on the respective pieces of drafting means (cooling fans) are much different from each other, the operation efficiency of the entire heat exchanging apparatus decreases, and the required power for the entire apparatus sometimes increases.

In the technology disclosed in Patent Document 2, cooling air is diverted to mutually adjacent heat exchangers by means of the baffle to suppress the cooling air from being introduced excessively into a heat exchanger that has strong suction force. However, when the necessary air amount or the suction force is much different among the plurality of heat exchangers, only if a baffle is disposed on the upstream side in the flowing direction of cooing air with respect to the heat exchangers on the boundary between the heat exchangers, it is considered that the suppression effect described above is insufficient.

The present invention has been made in order to solve the problem described above, and an object of the present invention resides in provision of a cooling device for a construction machine by which, when a plurality of cooling fans are used to supply cooling air to a plurality of heat exchangers, the deviation in load that occurs among the plurality of cooling fans can be reduced, and also, when a single cooling fan is used to supply cooling air to all of the plurality of heat exchangers, the air amount can be distributed appropriately to the heat exchangers.

Means for Solving the Problem

While the present application includes a plurality of pieces of means for solving the subject described above, as one example of the means, there is provided a cooling device for a construction machine, including a casing having a peripheral wall, a plurality of heat exchangers disposed side by side so as to extend transversely in the casing, and a plurality of fans that are disposed to be opposed to the plurality of heat exchangers and generate cooling air for the plurality of heat exchangers such that a suction side of the plurality of fans is a heat exchanger side. The casing has a plurality of baffles that extend from the heat exchanger side toward a fan side in a space surrounded by the peripheral wall and are arrayed in an arrangement direction of the plurality of heat exchangers. An end portion of each of the plurality of baffles on the heat exchanger side is positioned on a boundary between two mutually adjacent heat exchangers from among the plurality of heat exchangers or is positioned on any one of the plurality of heat exchangers. A first fan from among the plurality of fans is disposed at a position at which the first fan is opposed to one of the plurality of baffles and a second fan from among the plurality of fans is disposed at a position between the peripheral wall and a baffle adjacent to the peripheral wall from among the plurality of baffles or at a position between the plurality of baffles.

As another example, there is provided a cooling device for a construction machine, including a casing having a peripheral wall, a plurality of heat exchangers disposed side by side so as to extend transversely in the casing, and a single fan that is disposed to be opposed to the plurality of heat exchangers and generates cooling air for the plurality of heat exchangers such that a suction side of the single fan is a heat exchanger side. The casing has a plurality of baffles that extend from the heat exchanger side toward a fan side in a space surrounded by the peripheral wall and are arrayed in an arrangement direction of the plurality of heat exchangers.

Advantages of the Invention

According to the present invention, by disposing the first fan at a position at which it is opposed to the baffle, the amount of cooling air generated by the first fan can be distributed to flow paths partitioned by the baffle. Accordingly, the degree of freedom in distribution of the amount of air generated by the plurality of fans to the heat exchangers is improved from that in an alternative case in which the amount of air by each one fan is supplied to a heat exchanger without distributing the same. As a result, it becomes possible to reduce the deviation of load that occurs between the plurality of fans.

Further, according to the present invention, by defining a plurality of flow paths between the plurality of heat exchangers and the single fan by the peripheral fall and the plurality of baffles, the distribution of the amount of cooling air generated by the single fan to the flow paths can be adjusted accurately. Accordingly, in comparison with an alternative configuration in which a plurality of flow paths are not defined between the plurality of heat exchangers and the fan, it is possible to appropriately distribute the amount of cooling air that passes the heat exchangers positioned on the upstream side of the plurality of flow paths.

Other subjects, configurations and advantageous effects than those described above become apparent from the following description of embodiments.

MODES FOR CARRYING OUT THE INVENTION

In the following, embodiments of the cooling device for a construction machine of the present invention are described in detail with reference to the drawings. The embodiments are described taking a hydraulic excavator as an example of the construction machine.

First Embodiment

Figure 1:
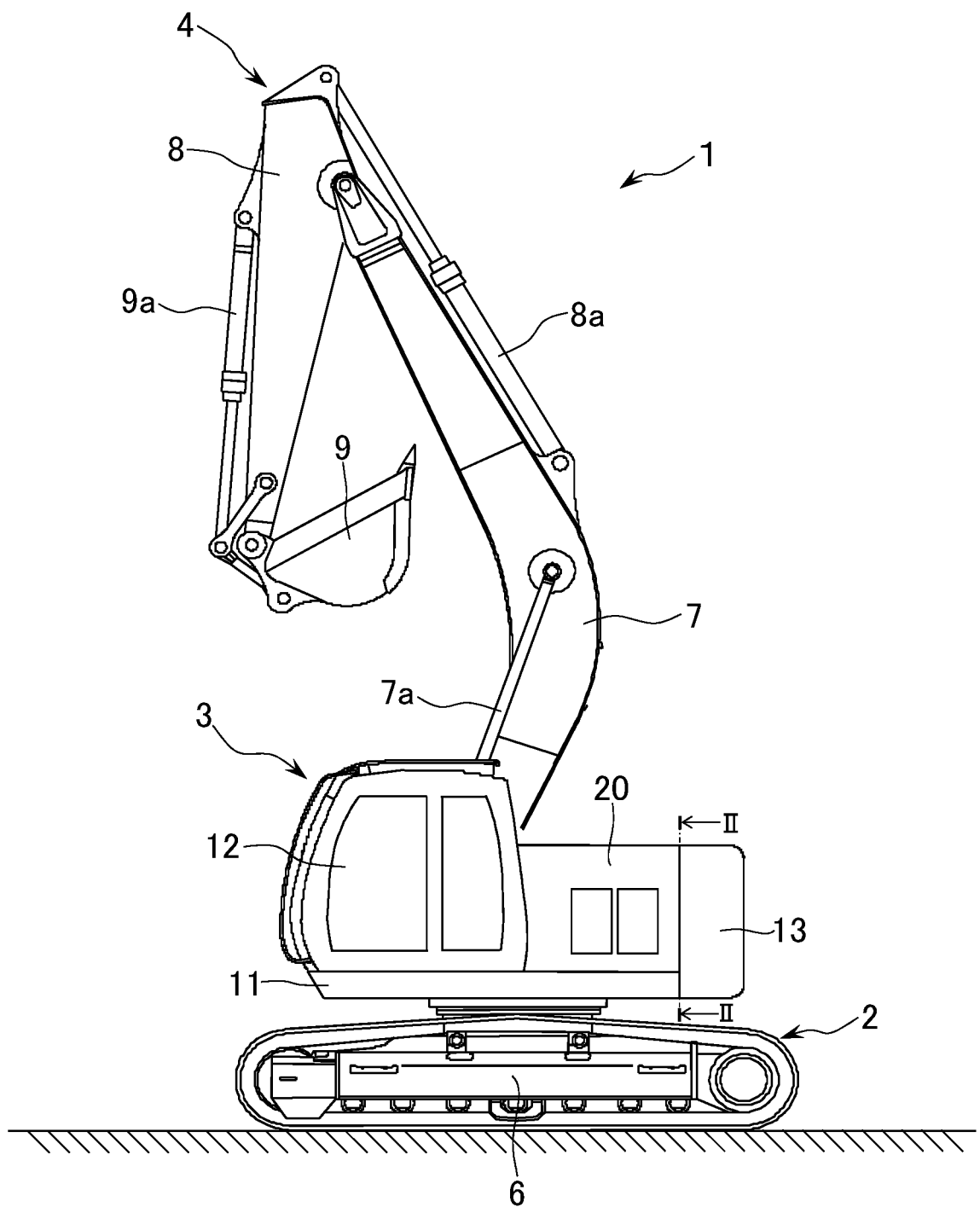
FIG. 1 is a side elevational view depicting a hydraulic excavator that includes a cooling device for a construction machine according to a first embodiment of the present invention.
Figure 2:
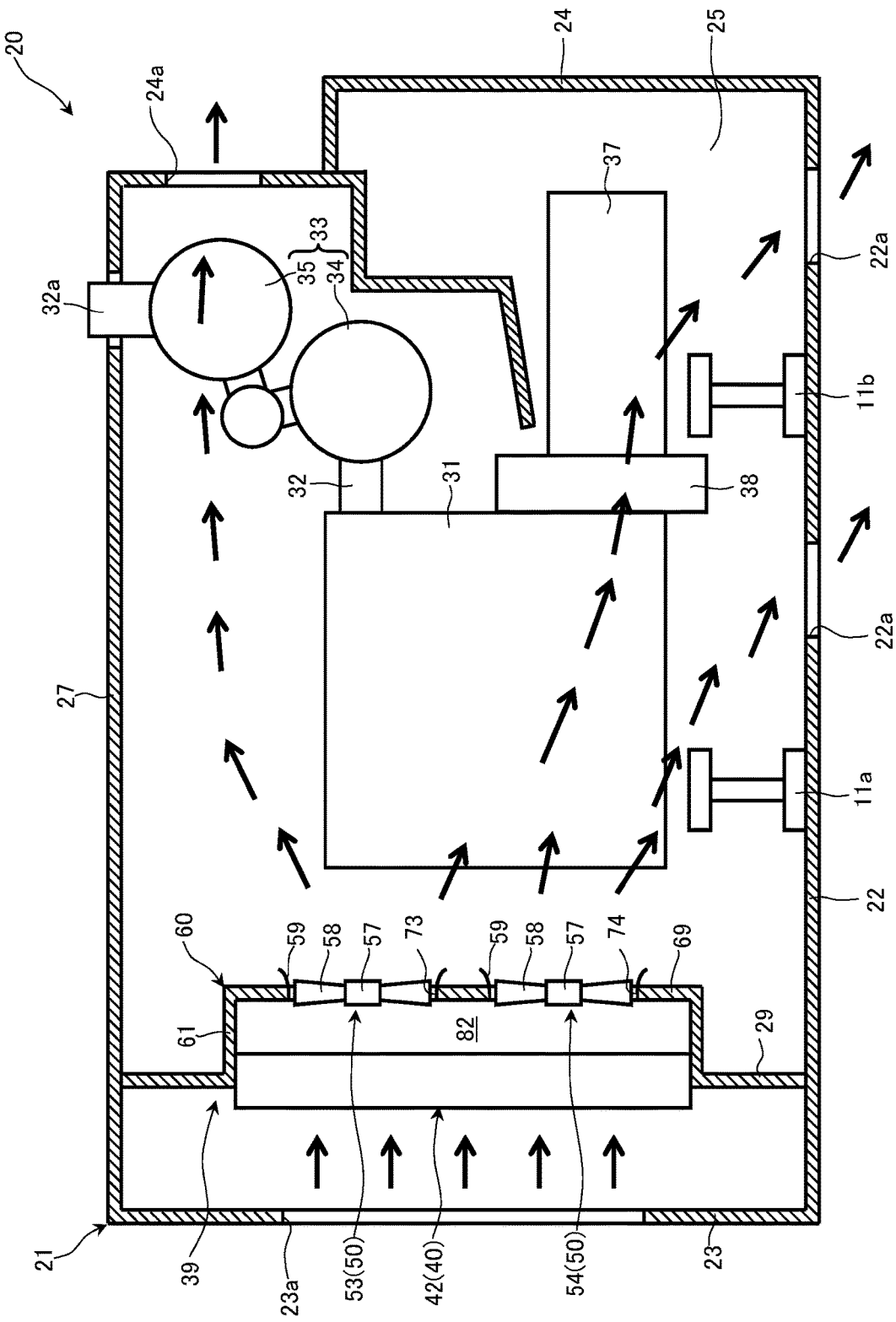
FIG. 2 is a sectional view taken along a line II-II of the hydraulic excavator depicted in FIG. 1 and is a schematic view depicting an internal configuration of a machine room of the hydraulic excavator.

First, a configuration of a hydraulic excavator that includes the cooling device for a construction machine according to first embodiment of the present invention is described with reference to FIGS. 1 and 2. FIG. 1 is a side elevational view depicting a hydraulic excavator that includes the cooling device for a construction machine according to first embodiment of the present invention. FIG. 2 is a sectional view taken along a line II-II of the hydraulic excavator depicted in FIG. 1 and is a schematic view depicting an internal configuration of a machine room of the hydraulic excavator. Here, description is given by use of forward, rearward, leftward and rightward directions as viewed from an operator sitting on an operator seat.

Referring to FIG. 1, the hydraulic excavator 1 generally includes a self-propelled lower track structure 2, an upper swing structure 3 mounted swingably on the lower track structure 2, and a front work implement 4 provided for upward and downward movement at a front portion of the upper swing structure 3. The lower track structure 2 includes track devices 6 of the crawler type (only one is depicted) on the left and right thereof. The left and right track devices 6 are individually driven by traveling motors (not depicted) as hydraulic actuators. The upper swing structure 3 is relatively swung with respect to the lower track structure 2 by a swing motor (not depicted) as a hydraulic actuator. The front work implement 4 is an articulated-type work implement for performing an excavation work and the like and includes a boom 7, an arm 8, and a bucket 9 as a work tool. The boom 7 is pivotably connected at the proximal end side thereof at a front portion of the upper swing structure 3. A proximal end portion of the arm 8 is pivotably connected to a distal end portion of the boom 7. A proximal end portion of the bucket 9 is pivotably connected to a distal end portion of the arm 8. The boom 7, the arm 8, and the bucket 9 are driven by a boom cylinder 7a, an arm cylinder 8a, and a bucket cylinder 9a as hydraulic actuators, respectively.

The upper swing structure 3 includes a swing frame 11 as a support structure mounted for swing motion on the lower track structure 2, a cab 12 installed on the front left side on the swing frame 11, a counterweight 13 provided at a rear end portion of the swing frame 11, and a machine room 20 provided between the cab 12 and the counterweight 13. In the cab 12, an operator seat on which an operator is to be seated, various operation devices (all not depicted) for operating the lower track structure 2, the front work implement 4, and the like, and other structures are disposed. The counterweight 13 is provided for balancing the weight against the front work implement 4.

In the machine room 20, an engine 31 as a prime mover is accommodated as depicted in FIG. 2. The engine 31 is supported on a left tail frame 11a and a right tail frame 11b that configure end portions of the swing frame 11 on the counterweight 13 side and is disposed in a transversely placed state in which the output power shaft thereof extends in the widthwise direction of the machine body. An exhaust pipe 32 for exhausting exhaust gas is connected to the engine 31. An exhaust gas after-treatment device 33 that purifies exhaust gas of the engine 31 is connected to the downstream side of the exhaust pipe 32. The exhaust gas after-treatment device 33 includes a PM collection device 34 that catches and collects particulate matter (PM) generated by combustion of the engine 31, and an NOx purification device 35 that purifies NOx contained in the exhaust gas of the engine 31, for example. The exhaust gas after-treatment device 33 is disposed, for example, above one side (in FIG. 2, right side) of the engine 31.

A hydraulic pump 37 is connected to the engine 31 via a power transmission device 38. The hydraulic pump 37 is disposed, for example, on the lower side of the exhaust gas after-treatment device 33. The hydraulic pump 37 is driven by the engine 31 to supply hydraulic fluid to hydraulic actuators such as the cylinders 7a, 8a, and 9a (refer to FIG. 1) of the front work implement 4, the travel motor of the lower track structure 2, and swing motor (both not depicted).

In the machine room 20, a cooling device 39 is disposed on the opposite side (in FIG. 2, left side) of the exhaust gas after-treatment device 33 and the hydraulic pump 37 across the engine 31. The cooling device 39 emits heat generated by driving of the hydraulic system including the hydraulic actuators 7a, 8a, and 9a, and the like, heat generated by driving of the engine 31, and the like to the outside of the hydraulic excavator 1. A detailed configuration of the cooling device 39 is hereinafter described.

The machine room 20 has an outer hull formed from a cover 21 that surrounds various devices such as the engine 31, the exhaust gas after-treatment device 33, the hydraulic pump 37, the cooling device 39, and the like. The cover 21 is formed substantially in a shape of, for example, a box that is open rearwardly and includes a lower cover 22, a left side cover 23 provided uprightly on the left end side of the lower cover 22, a right side cover 24 provided uprightly on the right end side of the lower cover 22, a front side cover 25 provided uprightly on the front end side of the lower cover 22 and extending between a front end of the left side cover 23 and a front end of the right side cover 24, and an upper cover 27 that covers an upward opening defined by the left and right side covers 23 and 24 and the front side cover 25. The rear opening of the cover 21 is closed with a front wall face of the counterweight 13.

A suction port 23a that takes external air into the machine room 20 therethrough is provided in the left side cover 23. Discharge ports 22a and 24a for exhausting cooling air to the outside of the machine room 20 therethrough are provided in the lower cover 22 and the right side cover 24, respectively. On the upper cover 27, a tail pipe 32a for exhausting exhaust gas of the engine 31 to the outside projects upwardly.

Figure 3:
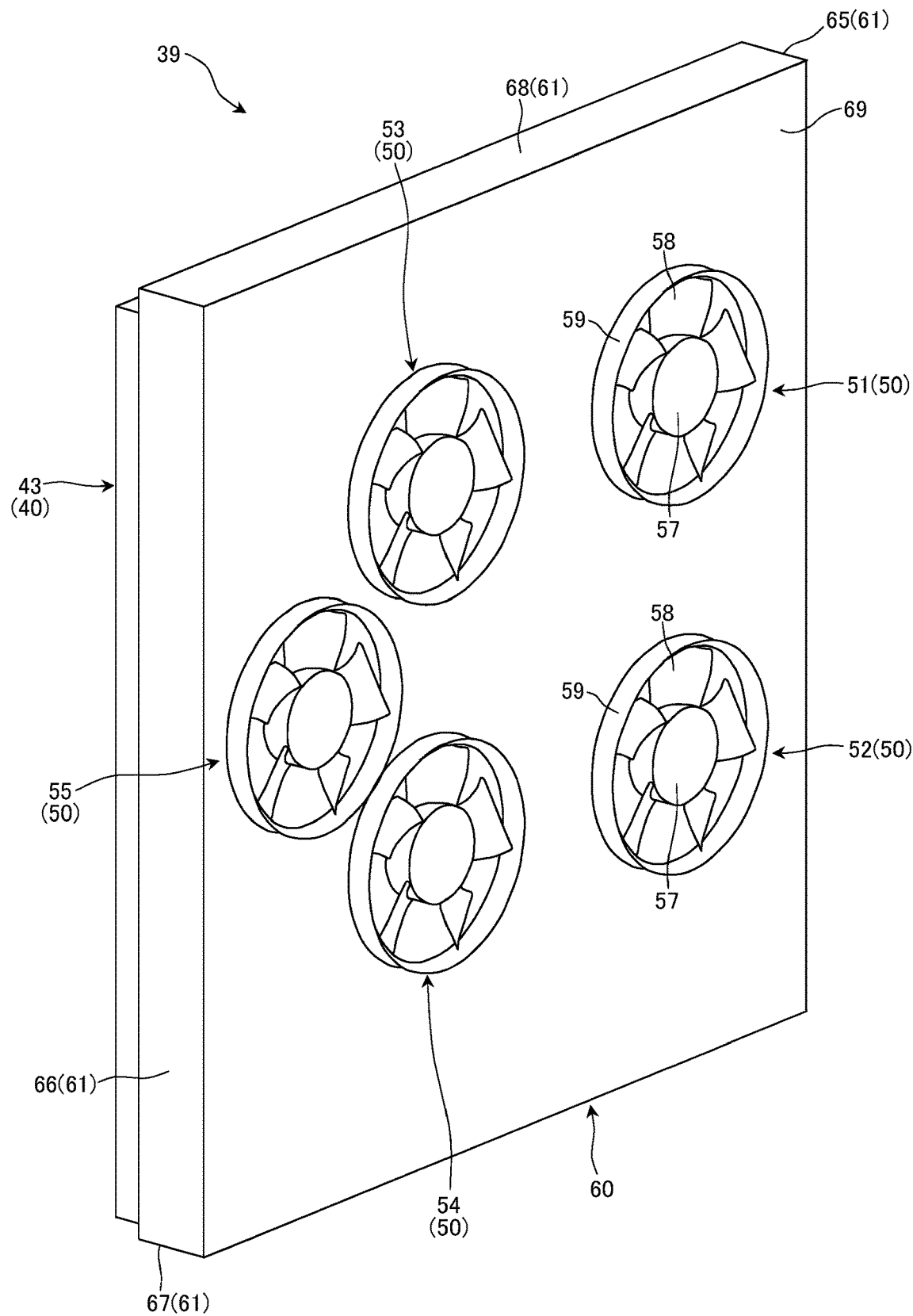
FIG. 3 is a perspective view of the cooling device for a construction machine according to the first embodiment of the present invention as viewed from a side of a fan.
Figure 4:
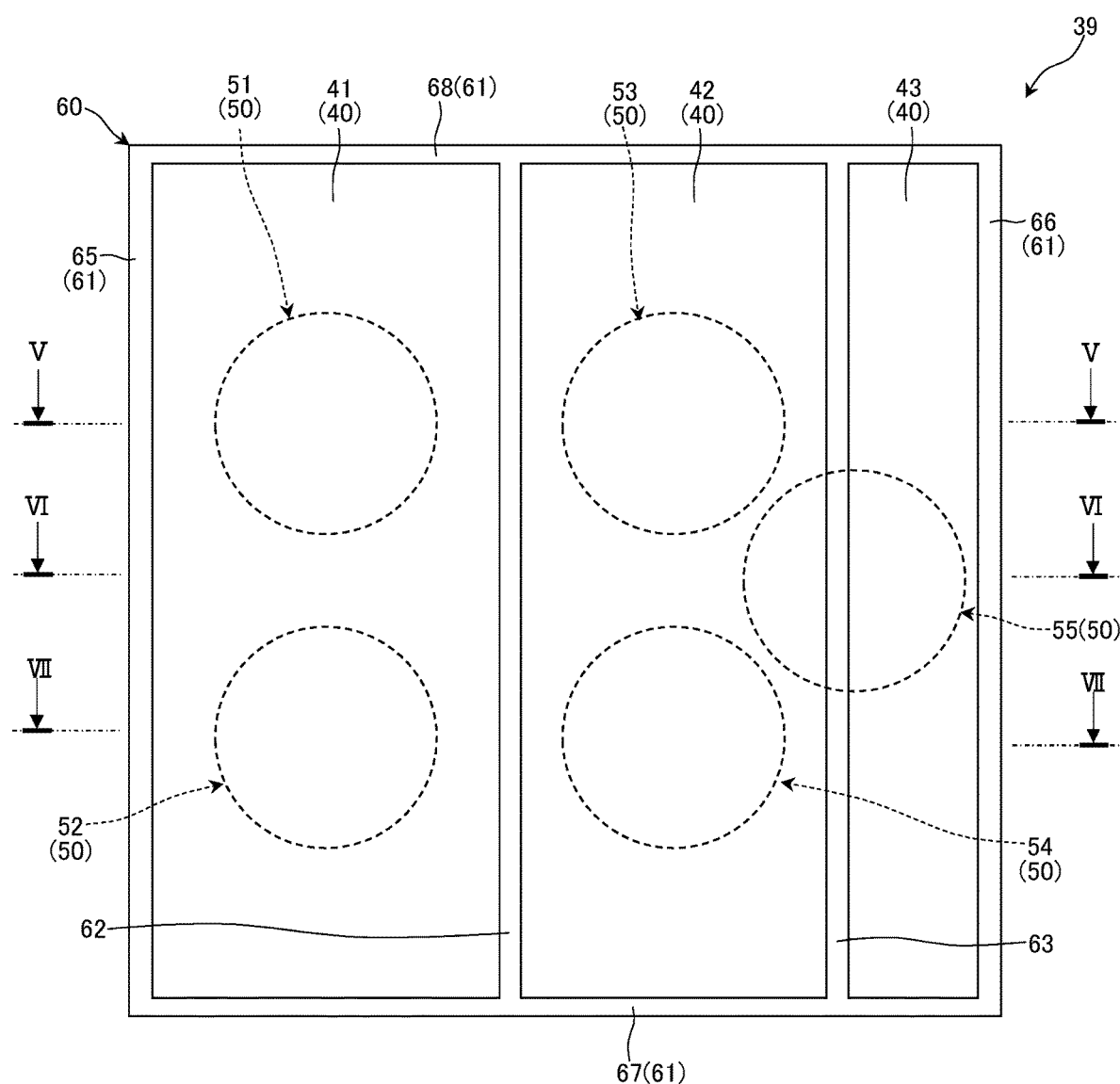
FIG. 4 is a front elevational view of the cooling device for a construction machine according to the first embodiment of the present invention as viewed from a side of a heat exchanger.
Figure 5:
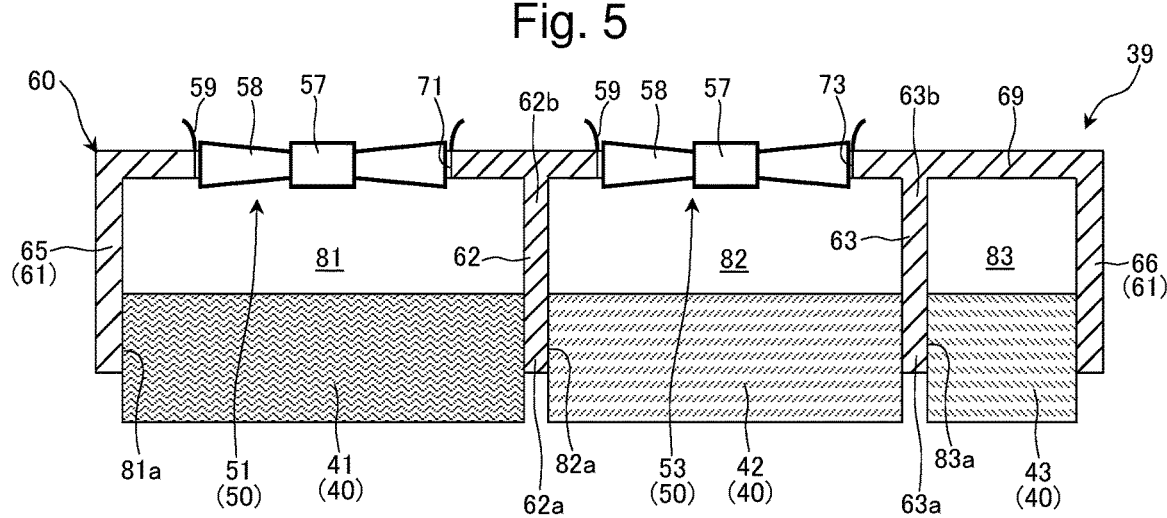
FIG. 5 is a schematic cross sectional view taken along a line V-V of the cooling device for a construction machine according to the first embodiment of the present invention depicted in FIG. 4.
Figure 6:
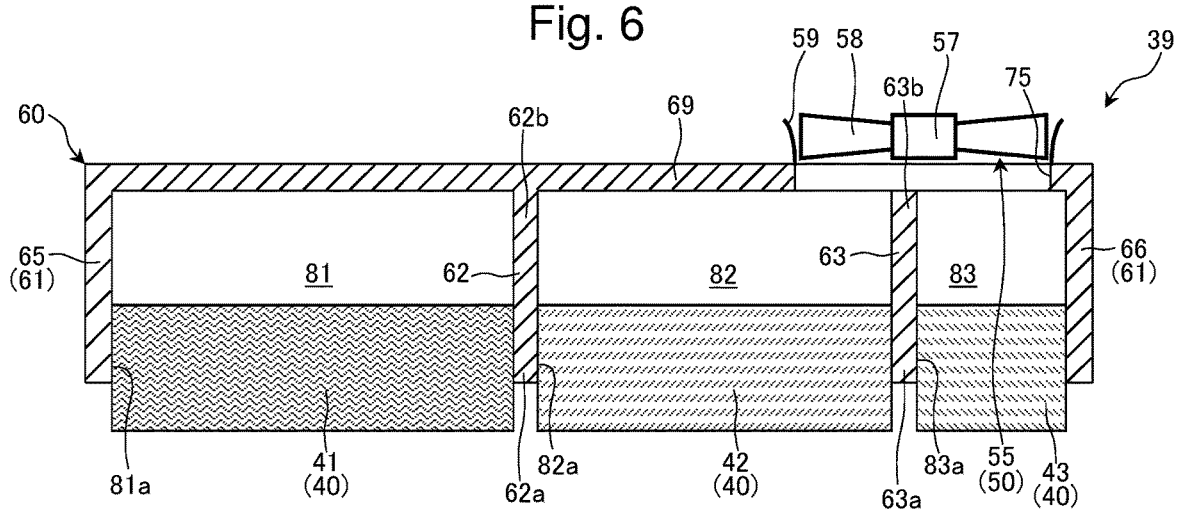
FIG. 6 is a schematic cross sectional view taken along a line VI-VI of the cooling device for a construction machine according to the first embodiment of the present invention depicted in FIG. 4.
Figure 7:
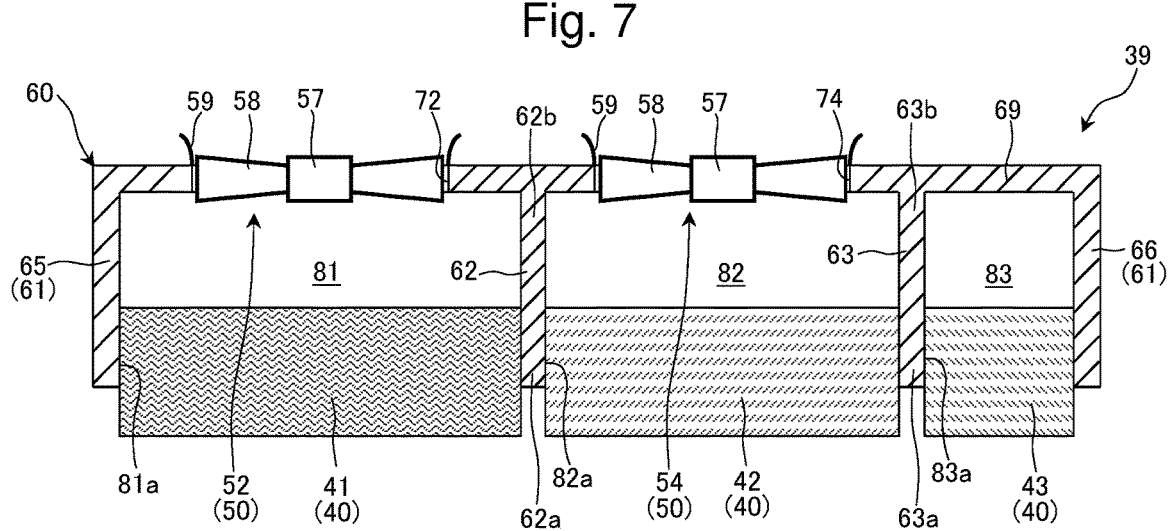
FIG. 7 is a schematic cross sectional view taken along a line VII-VII of the cooling device for a construction machine according to the first embodiment of the present invention depicted in FIG. 4.
Figure 8:
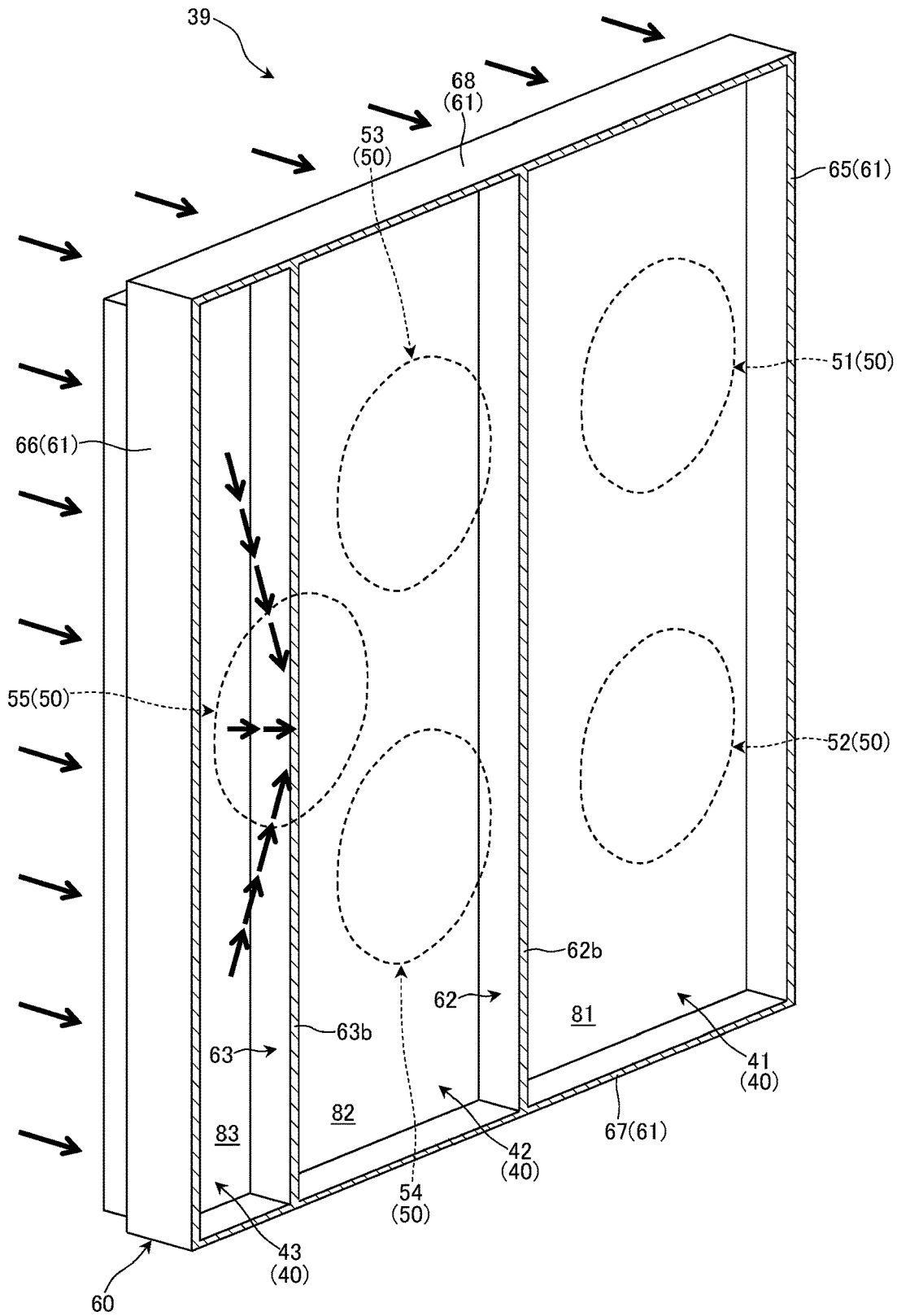
FIG. 8 is a schematic perspective view depicting an internal structure of a casing that is part of the cooling device for a construction machine according to the first embodiment of the present invention, in a partly omitted manner.

Now, a configuration of the cooling device for a construction machine according to the first embodiment of the present invention is described with reference to FIGS. 2 to 8. FIG. 3 is a perspective view of the cooling device for a construction machine according to the first embodiment of the present invention as viewed from a side of the fan. FIG. 4 is a front elevational view of the cooling device for a construction machine according to the first embodiment of the present invention as viewed from a side of the heat exchanger. FIG. 5 is a schematic cross sectional view of the cooling device for a construction machine according to the first embodiment of the present invention, taken along a line V-V depicted in FIG. 4. FIG. 6 is a schematic cross sectional view of the cooling device for a construction machine according to the first embodiment of the present invention, taken along a line VI-VI depicted in FIG. 4. FIG. 7 is a schematic cross sectional view of the cooling device for a construction machine according to the first embodiment of the present invention, taken along a line VII-VII depicted in FIG. 4. FIG. 8 is a schematic perspective view depicting an internal structure of a casing that configures part of the cooling device for a construction machine according to the first embodiment of the present invention in a partly omitted manner.

Referring to FIGS. 3 and 4, the cooling device 39 includes a heat exchanger group 40 including a plurality of heat exchangers, a cooling fan group 50 including a plurality of fans that supply cooling air to the heat exchanger group 40, and a casing 60 that holds the heat exchanger group 40 on one side thereof and holds the cooling fan group 50 on the other side thereof. The cooling device 39 is fixed in the machine room 20 through an attachment bracket 29 as depicted in FIG. 2.

The heat exchanger group 40 includes, for example, as depicted in FIG. 4, an oil cooler (hereinafter referred to sometimes as a first heat exchanger) 41 that cools hydraulic fluid that circulates in a hydraulic circuit including the cylinders 7a, 8a, and 9a (refer to FIG. 1) that actuate the front work implement 4, the hydraulic pump 37 (refer to FIG. 2), and the like, a radiator (hereinafter referred to sometimes as a second heat exchanger) 42 that cools cooling water for the engine 31, and an intercooler (hereinafter referred to sometimes as a third heat exchanger) 43 that cools the air compressed by a supercharger. The exchange heat amount required for the intercooler 43 is smaller than those required for the oil cooler 41 and the radiator 42, and also the size (external dimensions) of the intercooler 43 is smaller than those of the oil cooler 41 and the radiator 42. The air amounts necessary for the heat exchangers 41, 42, and 43 are determined according to the heat exchange amounts. That is, the air amount necessary for the intercooler 43 is smaller than that necessary for the oil cooler 41 or the radiator 42. The oil cooler 41, the radiator 42, and the intercooler 43 are formed in rectangular shapes that are substantially same in height but are different in width, and are positioned on a substantially same plane, as depicted in FIG. 4 to FIG. 7. That is, the oil cooler 41, the radiator 42, and the intercooler 43 are disposed side by side in this order such that they extend transversely in the casing 60.

The cooling fan group 50 is configured in such a way as to generate cooling air to blow from one side to the other side in the extending direction of the casing 60 (extending direction of a peripheral wall 61 hereinafter described), namely, generate cooling air whose suction side is the heat exchanger group 40 side. In the cooling fan group 50, the number of fans (but not in a unit of one fan) corresponding to each of the heat exchangers 41, 42, and 43 is set according to a relative magnitude of the heat exchange amount. That is, the number of fans corresponding to the oil cooler 41 or the radiator 42 whose heat exchange amount is relatively great is set greater than the number of fans corresponding to the intercooler 43 whose heat exchange amount is relatively small. For example, as depicted in FIGS. 3 to 7, the cooling fan group 50 includes a first fan 51 and a second fan 52 for supplying cooling air mainly to the oil cooler 41, a third fan 53 and a fourth fan 54 for supplying cooling air mainly to the radiator 42, and a fifth fan 55 for supplying cooling air to both the radiator 42 and the intercooler 43. The first fan 51 to fifth fan 55 are disposed side by side in the extending direction of the casing 60 (extending direction of the peripheral wall 61 to be hereinafter described). The first fan 51 and the second fan 52 are disposed such that they face (are opposed to) the first heat exchanger 41 and are spaced from each other in the upward and downward direction. The third fan 53 and the fourth fan 54 are disposed such that they face (are opposed to) the second heat exchanger 42 and are spaced in the upward and downward direction from each other. The fifth fan 55 is disposed such that it faces (is opposed to) the second heat exchanger 42 and the third heat exchanger 43 at a position at which it straddles between them. The position of the fifth fan 55 in the heightwise direction is between the third fan 53 and the fourth fan 54.

The first fan 51 to fifth fan 55 are configured such that they are all same in shape and size as depicted, for example, in FIG. 3. By configuring all of the first fan 51 to fifth fan 55 in the same specifications, reduction in costs can be achieved. Each of the fans 51, 52, 53, 54, and 55 has an impeller including a rotatable rotary shaft 57 and a plurality of blades 58 arrayed on an outer circumference of the rotary shaft 57, and a ring (shroud) 59 disposed on the outer circumference side of the impeller with a gap left therebetween. In the rotary shaft 57, for example, an electric motor as a driving device is built. The electric motor is driven by use of electric power generated by an alternator (not depicted) attached to the engine 31 (refer to FIG. 2).

As depicted in FIGS. 5 to 8, for example, the casing 60 has a peripheral wall 61 in the form of an angular tube extending in one direction (in FIGS. 5 to 7, upward and downward direction) as a casing main body, and a first baffle 62 and a second baffle 63 that extend from the heat exchanger group 40 side (in FIGS. 5 to 7, lower side) toward the cooling fan group 50 side (in FIGS. 5 to 7, upper side) in a space surrounded by the peripheral wall 61 and that are arrayed in the arrangement direction of the plurality of side-by-side heat exchangers 41, 42, and 43 (transverse direction of the peripheral wall 61). The peripheral wall 61 includes a first side face portion 65 on the left side and a second side face portion 66 on the right side as viewed from the one side in the extending direction (heat exchanger group 40 side), a lower face portion 67 that connects a lower end of the first side face portion 65 and a lower end of the second side face portion 66 to each other, and an upper face portion 68 that connects an upper end of the first side face portion 65 and an upper end of the second side face portion 66 to each other. The first baffle 62 and the second baffle 63 are formed such that they extend in parallel to the first side face portion 65 and the second side face portion 66 of the peripheral wall 61. In the present embodiment, the peripheral wall 61 is formed in an angular tube. However, as long as the peripheral wall 61 has a tubular shape, the cross sectional shape thereof in its extending direction can be any shape such as a polygonal shape.

The first baffle 62 and the second baffle 63 of the casing 60 define a plurality of (in FIGS. 5 to 8, three) flow paths the number of which is equal to the number (in FIGS. 5 to 8, three) of the heat exchangers 41, 42, and 43 of the heat exchanger group 40, together with the peripheral wall 61. The casing 60 functions as a suction flow path for the plurality of cooling fans 51, 52, 53, 54, and 55. A first flow path 81, a second flow path 82, and a third flow path 83 as the plurality of flow paths are defined so as to extend in parallel to each other and in the extending direction of the peripheral wall 61.

The first flow path 81 is formed by the first side face portion 65, part of the lower face portion 67, and part of the upper face portion 68 of the peripheral wall 61 and the first baffle 62. The third flow path 83 is formed by the second side face portion 66, part of the lower face portion 67, and part of the upper face portion 68 of the peripheral wall 61 and the second baffle 63. The second flow path 82 is formed by the remaining part of the lower face portion 67 and the remaining part of the upper face portion 68 of the peripheral wall 61, the first baffle 62, and the second baffle 63 and is located between the first flow path 81 and the third flow path 83. That is, the first baffle 62 partitions the mutually adjacent first flow path 81 and second flow path 82 from each other, and the second baffle 63 partitions the mutually adjacent second flow path 82 and third flow path 83 from each other.

On one side in the extending direction of the peripheral wall 61, an opening 81a of the first flow path 81, an opening 82a of the second flow path 82 and an opening 83a of the third flow path 83 are formed. The oil cooler 41 is disposed in the opening 81a on the one side of the first flow path 81. The radiator 42 is disposed in the opening 82a on the one side of the second flow path 82. The intercooler 43 is disposed in the opening 83a on the one side of the third flow path 83. That is, a one side end portion 62a of the first baffle 62 in the extending direction of the peripheral wall 61 (end portion on the heat exchanger group 40 side) is positioned on the boundary between the mutually adjacent oil cooler 41 and radiator 42. A one side end portion 63a of the second baffle 63 in the extending direction of the peripheral wall 61 (end portion of the heat exchanger group 40 side) is positioned on the boundary between the mutually adjacent radiator 42 and intercooler 43.

As depicted in FIGS. 3 and 5 to 7, on the other side in the extending direction of the peripheral wall 61 (in FIGS. 5 to 7, upper side), an attachment wall 69 to which the cooling fan group 50 is to be attached is provided. The attachment wall 69 closes off the other side of each of the first flow path 81, the second flow path 82, and the third flow path 83. Five attachment holes 71, 72, 73, 74, and 75 corresponding to the number of fans of the cooling fan group 50 are formed in the attachment wall 69. The impellers of the first fan 51, the second fan 52, the third fan 53, and the fourth fan 54 are disposed in the first attachment hole 71, the second attachment hole 72, the third attachment hole 73, and the fourth attachment hole 74, respectively, and the rings 59 of the first fan 51 to fourth fan 54 are provided at opening edge portions of the first attachment hole 71 to fourth attachment hole 74, respectively, in such a way as to project to the outside. The impeller of the fifth fan 55 is disposed with a gap left from the opening of the fifth attachment hole 75 to the outer side, and the ring 59 of the fifth fan 55 is provided at an opening edge of the fifth attachment hole 75 in such a way as to project to the outside.

The first attachment hole 71 and the second attachment hole 72 are positioned between the first side face portion 65 of the peripheral wall 61 and the other side end portion 62b of the first baffle 62 in the extending direction of the peripheral wall 61 (end portion on the cooling fan group 50 side). That is, the first fan 51 and the second fan 52 are disposed at positions corresponding to the inside of the range of the first flow path 81 (positions between the peripheral wall 61 and the first baffle 62) without straddling the other side end portion 62b of the first baffle 62, and the first attachment hole 71 and the second attachment hole 72 constitute an outlet of the first flow path 81. The third attachment hole 73 and the fourth attachment hole 74 are positioned between the other side end portion 62b of the first baffle 62 and the other side end portion 63b of the second baffle 63 in the extending direction of the peripheral wall 61 (end portion on the cooling fan group 50 side). That is, the third fan 53 and the fourth fan 54 are disposed at positions corresponding to the inside of the range of the second flow path 82 (positions between the first baffle 62 and the second baffle 63) without straddling the other side end portion 62b of the first baffle 62 and the other side end portion 63b of the second baffle 63, and the third attachment hole 73 and the fourth attachment hole 74 constitute an outlet of the second flow path 82. The fifth attachment hole 75 is formed so as to straddle the other side end portion 63b of the second baffle 63. That is, the fifth fan 55 is disposed at a position at which it is opposed to the other side end portion 63b of the second baffle 63 and straddles the other side end portion 63b of the second baffle 63 so as to extend over only both the mutually adjacent second flow path 82 and third flow path 83, and the fifth attachment hole 75 constitutes an outlet of both the second flow path 82 and the third flow path 83. That is, the first fan 51 to fifth fan 55 are disposed such that cooling air generated by any of the first fan 51 to fifth fan 55 flows to each of the first flow path 81 to third flow path 83.

In this manner, in the cooling device 39, the relative positions of the one side end portions 62a and 63a of the first baffle 62 and the second baffle 63 (end portions on the heat exchanger group 40 side) with respect to the plurality of heat exchangers 41, 42, and 43 and the relative positions of the other side end portions 62b and 63b of the first baffle 62 and the second baffle 63 (end portions on the cooling fan group 50 side) with respect to the plurality of cooling fans 51, 52, 53, 54, and 55 are determined according to the relative magnitude of the heat exchange amounts among the plurality of heat exchangers 41, 42, and 43. That is, the relative disposition of the plurality of cooling fans 51, 52, 53, 53, and 55 with respect to the plurality of flow paths 81, 82, and 83 are determined in the following manner. To the second heat exchanger 42 whose heat exchange amount is relatively greatest, an amount of air corresponding to approximately 2.5 fans is supplied; to the first heat exchanger 41 whose heat exchange amount is second greatest, an amount of air corresponding to approximately two fans is supplied; and to the third heat exchanger 43 whose heat exchange amount is relatively smallest, an amount of air corresponding to approximately 0.5 fans is supplied. The present cooling device 39 does not allocate the number of fans in a unit of one fan to each of the heat exchangers 41, 42, and 43, but adjusts the positions of the end portions 62b and 63b on the fan side of the baffles 62 and 63, which partition the plurality of flow paths 81, 82, and 83, to distribute the amount of air of one fan to adjust the amount of air to be supplied to each of the heat exchangers 41, 42, and 43.

Figure 9:
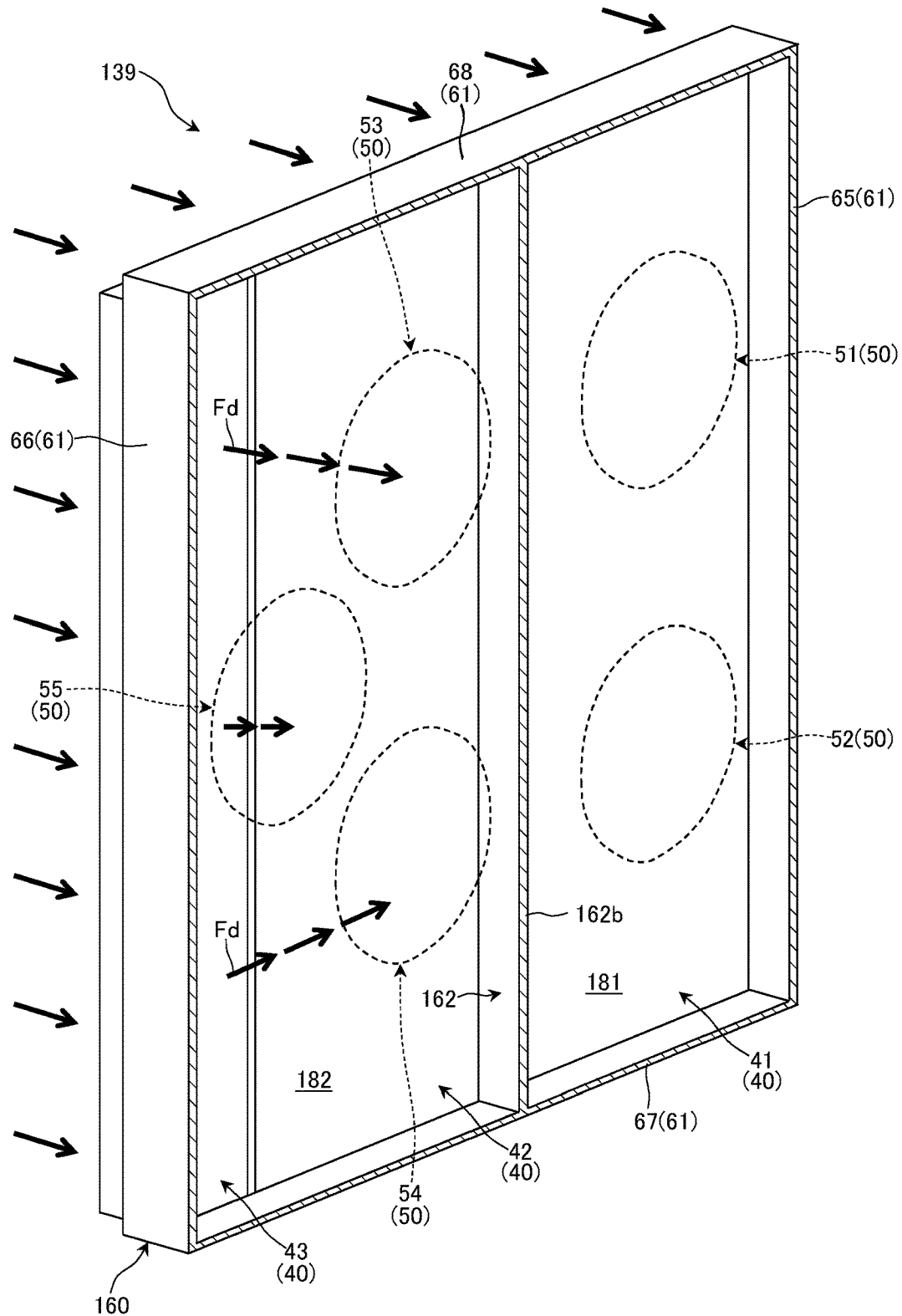
FIG. 9 is an explanatory view depicting a flow of cooling air in a cooling device of a comparative example for the cooling device for a construction machine according to the first embodiment of the present invention.

Now, actions and advantages of the cooling device for a construction machine according to the first embodiment of the present invention are described with reference to FIGS. 2, 8, and 9. FIG. 9 is an explanatory view depicting a flow of cooling air in a cooling device of a comparative example for the cooling device for a construction machine according to the first embodiment of the present invention. In FIGS. 2, 8, and 9, a thick arrow mark indicates a flow of cooling air and its flowing direction.

In the hydraulic excavator 1 in which the cooling device 39 is accommodated in the machine room 20, when the cooling fan group 50 is driven, then external air is sucked from the suction port 23a of the cover 21 of the machine room 20, and cooling air is generated in the machine room 20, as depicted in FIG. 2. This cooling air first cools the heat exchanger group 40 in the machine room 20 and is delivered from the cooling fan group 50 through the flow paths 81, 82, and 83 in the casing 60. The cooling air delivered from the cooling fan group 50 cools the engine 31 and peripheral portions of the exhaust gas after-treatment device 33 and the hydraulic pump 37 and then is exhausted from the discharge ports 22a and 24a of the cover 21 to the outside of the machine room 20. Since cooling air generated by the cooling fan group 50 cools various types of equipment accommodated in the machine room 20, such as the heat exchanger group 40, it is possible to allow the various types of equipment in the machine room 20 to operate regularly.

Incidentally, a cooling device 139 of the comparative example depicted in FIG. 9 does not include the second baffle 63 (refer to FIG. 8) of the casing 60 of the cooling device 39 according to the present embodiment. It is to be noted that the configuration of the heat exchanger group 40 and the cooling fan group 50 in the cooling device 139 of the comparative example is similar to that of the cooling device 39 according to the present embodiment.

That is, in a casing 160 of the comparative example, a first flow path 181 and a second flow path 182 partitioned by a first baffle 162 are formed. While the first flow path 181 in the comparative example is similar to the first flow path 81 in the present embodiment, the second flow path 182 in the comparative example is equivalent to the second flow path 82 and the third flow path 83 in the present embodiment that are communicated fully with each other. That is, the first flow path 181 in the comparative example is a flow path in which only the oil cooler 41 is disposed at an opening on one side thereof. In the meantime, the second flow path 182 in the comparative example is a flow path in which the radiator 42 and the intercooler 43 are disposed at an opening on one side thereof.

In the cooling device 139 of the comparative example, the fifth fan 55 that faces (is opposed to) the radiator 42 and the intercooler 43 in a state in which it straddles both of them sucks the air from both regions on the radiator 42 side and the intercooler 43 side. Further, the third fan 53 and the fourth fan 54 that face (are opposed to) the radiator 42 suck the air from the region on the radiator 42 side and additionally sucks the air also from the region on the intercooler 43 side because there is no baffle that partitions the radiator 42 side and the intercooler 43 side. That is, the suction regions of the third fan 53 and the fourth fan 54 that face the radiator 42 spread to both regions on the radiator 42 side and the intercooler 43 side, and on one side in the extending direction of the second flow path 182, a flow Fd in a direction (widthwise direction of the casing 160) inclined significantly with respect to the extending direction of the second flow path 182 (extending direction of the peripheral wall 61) is present in cooling air generated by the third fan 53 and the fourth fan 54. Therefore, a sufficient amount of air is supplied to the intercooler 43 because the amount of air from the third fan 53 and the fourth fan 54 is added to the amount of air from the fifth fan 55. However, since part of the amount of air generated by the third fan 53 and the fourth fan 54 is distributed to the intercooler 43 side, it is necessary to increase the amount of air of the third fan 53 and the fourth fan 54 in order to obtain a necessary amount of air for the radiator 42. Therefore, it becomes necessary to operate the third fan 53 and the fourth fan 54 with a higher speed of rotation in comparison with the fifth fan 55.

The shaft power of a fan generally increases in proportion to the third power of the rotation speed. When the rotation speeds of some of the plurality of fans increase, then the power consumption of the entire cooling fan group 50 increases. Further, noise of a fan generally increases in proportion to the fifth to sixth power of the rotation speed. When the rotation speeds of some of the plurality of fans increase, then also noise of the cooling fan group 50 increases as much.

In the case of the cooling device 139 of the comparative example that does not include the second baffle 63 in the first embodiment, since it is necessary to operate the third fan 53 and the fourth fan 54 at a higher speed in comparison with the fifth fan 55, deviation of the load occurs between the third fan 53 and fourth fan 54, and the fifth fan 55. As a result, power consumption and noise of the entire cooling fan group 50 increase.

In contrast, in the present embodiment, the second flow path 82 corresponding only to the radiator 42 and the third flow path 83 corresponding only to the intercooler 43 are formed by the second baffle 63 of the casing 60, as depicted in FIG. 8. Further, the third fan 53 and the fourth fan 54 are disposed at positions between the other side end portion 62b of the first baffle 62 and the other side end portion 63b of the second baffle 63, and the fifth fan 55 is disposed at a position at which it straddles (is opposed to) the other side end portion 63b of the second baffle 63.

Accordingly, the third fan 53 and the fourth fan 54 that face the radiator 42 suck the air mainly from the region on the radiator 42 side because suction of the air from the region on the intercooler 43 side is hindered by the second baffle 63. Further, the fifth fan 55 straddling both the second flow path 82 and the third flow path 83 sucks the air from both the region on the intercooler 43 side and the region on the radiator 42 side. Therefore, to the radiator 42 whose heat exchange amount is relatively great, part of the amount of air of the fifth fan 55 is supplied in addition to the amount of air of the third fan 53 and the fourth fan 54. On the other hand, to the intercooler 43 whose heat exchange amount is relatively small, only part of the amount of air of the fifth fan 55 is supplied. Accordingly, since part of the amount of air of the fifth fan 55 is supplied for compensation to the radiator 42 side, amounts of air necessary for both the radiator 42 and the intercooler 43 can be obtained without increasing the amount of air of the third fan 53 and the fourth fan 54.

For example, when the rotation speeds of the third fan 53, the fourth fan 54, and the fifth fan 55 are set to similar speeds, the amount of air by the fifth fan 55 sometimes becomes an amount of air greater than a necessary amount to the intercooler 43. However, by adjusting the position of the other side end portion 63b of the second baffle 63, the amount of air excessive to the intercooler 43 from within the amount of air of the fifth fan 55 is supplied to the radiator 42. The amount of air supplied from the third fan 53 and the fourth fan 54 can be decreased by the amount of air supplied from the fifth fan 55 to the radiator 42. That is, the load among the plurality of cooling fans 51, 52, 53, 54, and 55 can be distributed, and power consumption and noise of the entire cooling device 39 can be suppressed.

Further, in the present embodiment, by adjusting the relative position of the fifth fan 55 and the other side end portion 63b of the second baffle 63, it is possible to adjust the distribution ratio of the amount of air of the fifth fan 55 with respect to the second flow path 82 and the third flow path 83. Consequently, fluctuation of the load between the plurality of fans can be suppressed further.

Further, the present embodiment is configured such that both the heat exchangers of the radiator 42 and the intercooler 43 are disposed adjacent to each other and the amount of air of the fifth fan 55 is distributed to the radiator 42 and the intercooler 43. Since both the heat exchange amounts of the radiator 42 and the intercooler 43 necessary upon driving of the hydraulic excavator 1 vary according to the load on the engine 31, it is reasonable to share the fan between them whose necessary amounts of air change in an interlocked relation with each other. On the other hand, since the heat exchange amount of the oil cooler 41 necessary upon driving of the hydraulic excavator 1 changes according not to the load on the engine 31 but to the load on the hydraulic equipment, the change in the necessary amount of air for the oil cooler 41 is not interlocked with that of the intercooler 43 or the radiator 42. Therefore, cooing air supplied by the fans 51 and 52 corresponding to the oil cooler 41 and cooling air supplied by the fans 53, 54, and 55 corresponding to the radiator 42 and the intercooler 43 are separated fully by the first baffle 62.

As described hereinabove, the cooling device 39 for a construction machine according to the first embodiment of the present invention includes the casing 60 having the peripheral wall 61, the plurality of heat exchangers 41, 42, and 43 disposed side by side so as to extend transversely in the casing 60, and the plurality of cooling fans 51, 52, 53, 54, and 55 that are disposed to be opposed to the plurality of heat exchangers 41, 42, and 43 and generate cooling air for the plurality of heat exchangers 41, 42, and 43 such the suction side of the plurality of cooling fans 51, 52, 53, 54, and 55 is the heat exchanger group 40 side. The casing 60 has the plurality of baffles 62 and 63 extending from the heat exchanger group 40 side toward the cooling fan group 50 side in the space surrounded by the peripheral wall 61 and arrayed in the arrangement direction of the plurality of heat exchangers 41, 42, and 43. The first end portions 62a and 63a of the plurality of baffles 62 and 63 on the heat exchanger group 40 side are positioned on the boundary between two mutually adjacent heat exchangers among the plurality of heat exchangers 41, 42, and 43. Of the cooling fans 51, 52, 53, 54, and 55, the fifth fan 55 is disposed at the position at which the fifth fan 55 is opposed to one (second baffle 63) of the plurality of baffles 62 and 63, and the first to fourth fans 51, 52, 53, and 54 are disposed at positions between the peripheral wall 60 and the baffles 62 and 63 adjacent to the peripheral wall 60 or between the plurality of baffles 62 and 63.

According to the present configuration, since the fifth fan 55 is disposed at the position at which it is opposed to the other side end portion 63b of the second baffle 63, the amount of cooling air generated by the fifth fan 55 can be distributed to the mutually adjacent flow paths 82 and 83 partitioned by the second baffle 63. That is, the degree of freedom in distribution of the amount of air generated by the plurality of cooling fans 51, 52, 53, 54, and 55 to the heat exchangers 41, 42, and 43 is improved in comparison with that in an alternative case in which the amount of air by each fan is supplied to the heat exchangers without distributing the same. As a result, it becomes possible to reduce the deviation of load that occurs among the plurality of cooling fans 51, 52, 53, 54, and 55.

Further, in the present embodiment, the fifth fan 55 is disposed so as to be opposed only to the mutually adjacent heat exchangers 42 and 43 among the plurality of heat exchangers 41, 42, and 43. With this configuration, the fifth fan 55 can be disposed so as to straddle the two mutually adjacent flow paths 82 and 83 without complicating the structure of the second baffle 63 of the casing 60. That is, the second baffle 63 can be formed in parallel without forming the second baffle 63 in an inclined relation to the peripheral wall 61.

Second Embodiment

Figure 10:
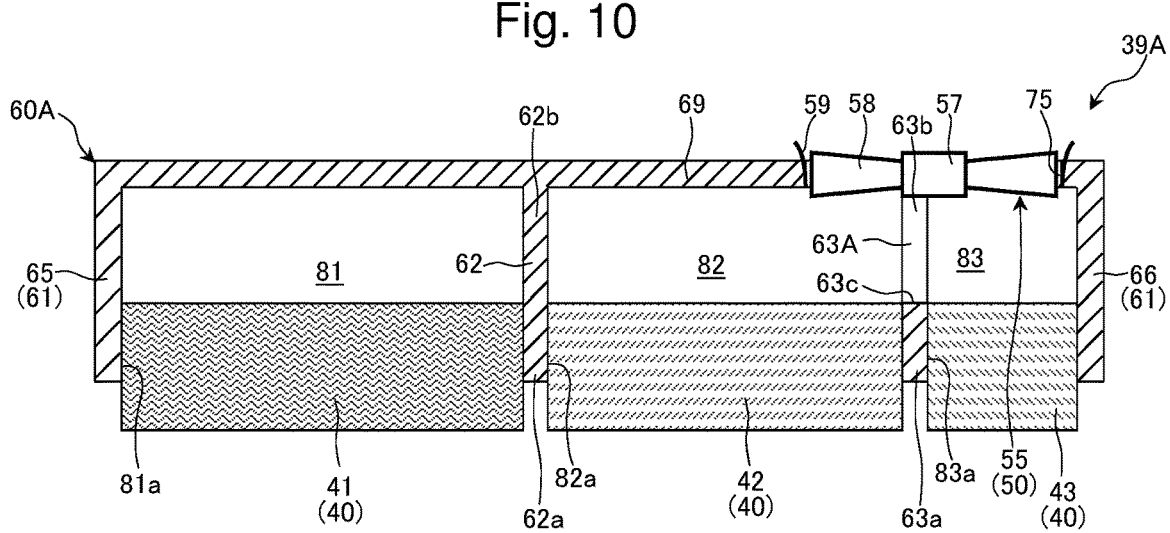
FIG. 10 is a schematic cross sectional view taken along a line corresponding to the line VI-VI of FIG. 4, depicting a cooling device for a construction machine according to a second embodiment of the present invention.
Figure 11:
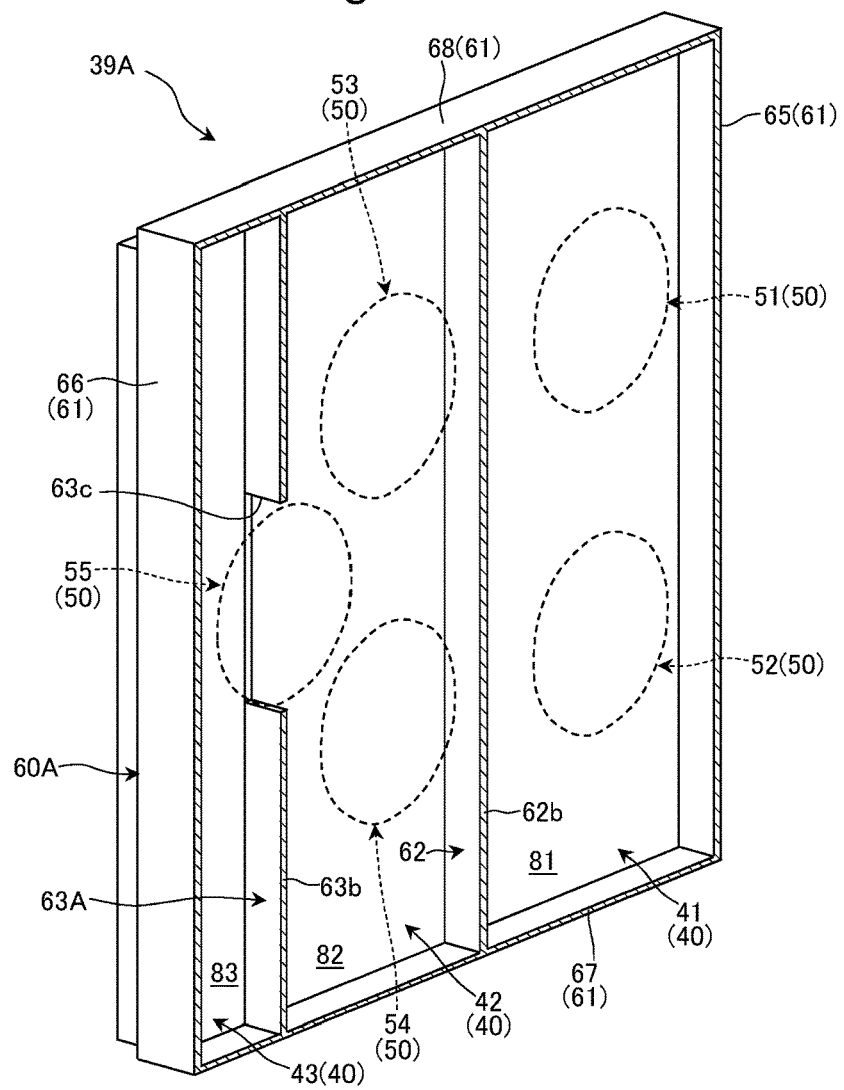
FIG. 11 is a schematic cross sectional view depicting an internal structure of a casing that is part of the cooling device for a construction machine according to the second embodiment of the present invention depicted in FIG. 10, in a partly omitted manner.

Now, a cooling device for a construction machine according to a second embodiment of the present invention is described with reference to FIGS. 10 and 11. FIG. 10 is a schematic sectional view taken along a line corresponding to the line VI-VI of FIG. 4 depicting the cooling device for a construction machine according to the second embodiment of the present invention. FIG. 11 is a schematic sectional view depicting an internal structure of a casing that configures part of the cooling device for a construction machine according to the second embodiment of the present invention depicted in FIG. 10, in a partly omitted manner. It is to be noted that, in FIGS. 10 and 11, the same characters as those in FIGS. 1 to 9 denote the same elements, and therefore, detailed description of them is omitted.

The cooling device 39A for a construction machine according to the second embodiment of the present invention depicted in FIGS. 10 and 11 is different from that of the first embodiment mainly in that the other side end portion 63b of the second baffle 63A of the casing 60A (end portion on the cooling fan group 50 side) has a cutout 63c at a position thereof corresponding to the disposition position of the fifth fan 55 and that the impeller of the fifth fan 55 is disposed in the inside of the fifth attachment hole 75 of the casing 60A. The cutout 63c of the second baffle 63A is formed so as to extend from the position of the attachment wall 69 of the casing 60A to a position of the surface of each of the radiator 42 and the intercooler 43 that faces the fifth fan 55 (end face on the other side in the extending direction of the peripheral wall 61). That is, the second flow path 82 and the third flow path 83 are in a communicated state with each other around the fifth fan 55.

The cutout 63c of the second baffle 63A allows the casing 60A to hold the impeller of the fifth fan 55 in the inside thereof. Accordingly, since the impeller of the fifth fan 55 can be disposed so as not to be exposed to the outside of the casing 60A, the degree of freedom of the installation position of the cooling device 39 in the machine room 20 is increased.

Incidentally, generally in a fan, while a flow in a direction inclined with respect to the extending direction of a flow path is likely to be generated on the side far from the suction position, a flow in a direction inclined with respect to the extending direction of the flow path is unlikely to be generated due to the suction force of the fan. For example, as depicted in FIG. 9, on one side in the extending direction of the casing 160 (side far from the suction position), since no baffle is present in the second flow path 182, a flow Fd in a direction (widthwise direction of the casing 160) inclined significantly from the extending direction of the second flow path 182 (extending direction of the peripheral wall 61) is generated by the fans 53 and 54.

Since the second baffle 63A according to the present embodiment does not have a cutout formed at the one side end portion 63a (end portion on the heat exchanger group 40 side), cooling air generated by the third fan 53 and the fourth fan 54 can be prevented from flowing into the second flow path 82 via the intercooler 43 positioned on the one side in the extending direction of the casing 60A. Further, although the second baffle 63A has the cutout 63c at the other side end portion 63b thereof on the fifth fan 55 side, the flow in the proximity of the suction side of the third fan 53 and the fourth fan 54 becomes a flow along the extending direction of the second flow path 82 and the flow in the proximity of the suction side of the fifth fan 55 becomes a flow along the extending direction of the second flow path 82 and the third flow path 83. Therefore, a flow that passes the intercooler 43 is not sucked into the third fan 53 and the fourth fan 54 via the cutout 63c formed in the proximity of the fifth fan 55.

Further, the flow to be sucked into the fifth fan 55 suffers from disturbance or resistance when it flows around the second baffle 63A. However, the cutout 63c provided at the other side end portion 63b of the second baffle 63A reduces the disturbance and the resistance generated by the second baffle 63A, and also reduces noise. As a result, the efficiency of the fifth fan 55 is improved.

According to the cooling device for a construction machine according to the second embodiment of the present invention described above, the amount of cooling air generated by the fifth fan 55 can be distributed to the two mutually adjacent flow paths 82 and 83 partitioned by the second baffle 63A, and it is therefore possible to reduce the deviation of the load that occurs among the plurality of fans 51, 52, 53, 54, and 55 as in the first embodiment described hereinabove.

Modifications of Second Embodiment

Figure 12:
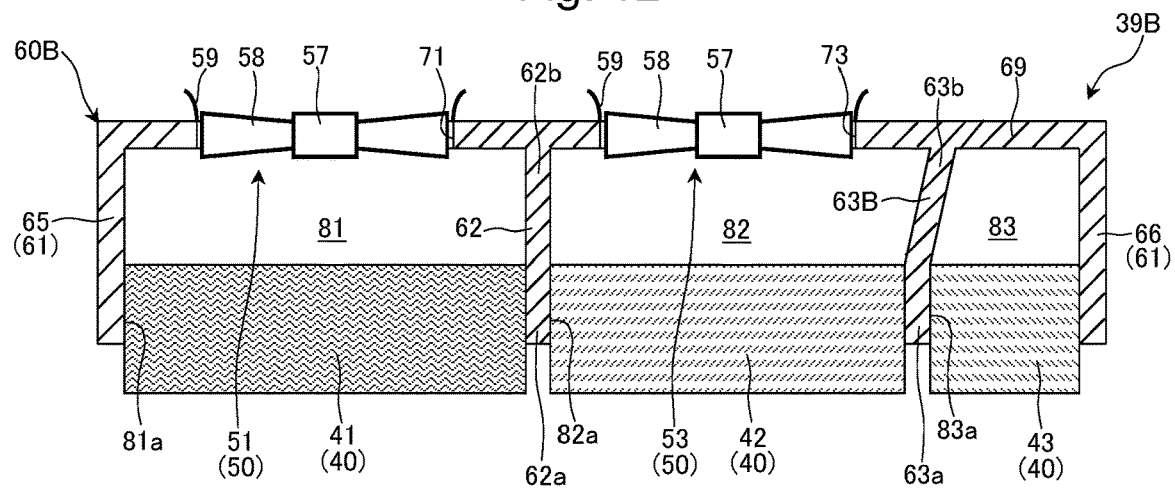
FIG. 12 is a schematic cross sectional view taken along a line corresponding to the line V-V of FIG. 4, depicting a cooling device for a construction machine according to a first modification of the second embodiment of the present invention.
Figure 13:
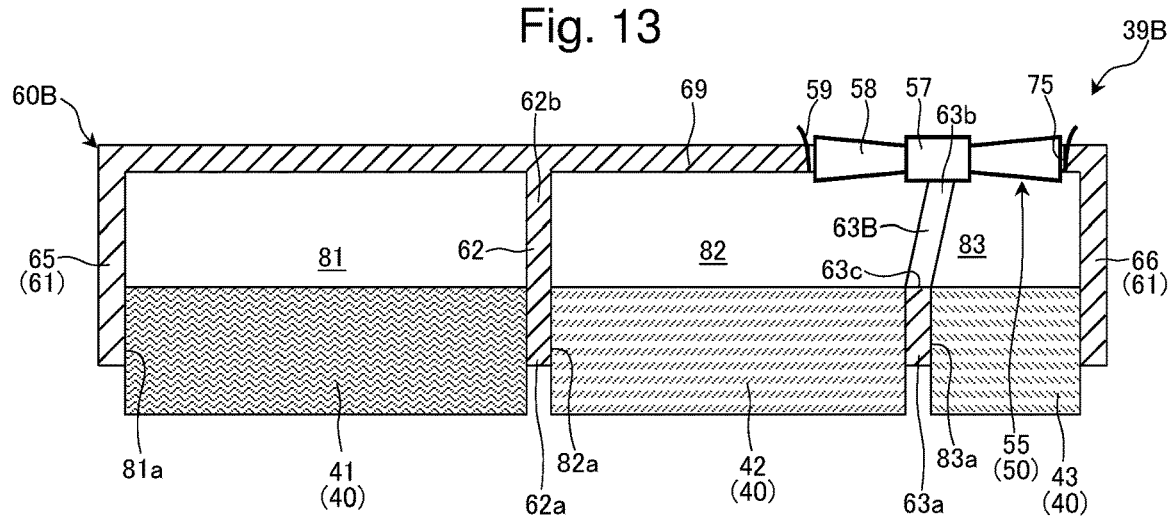
FIG. 13 is a schematic cross sectional view taken along a line corresponding to the line VI-VI of FIG. 4, depicting the cooling device for a construction machine according to the first modification of the second embodiment of the present invention.
Figure 14:
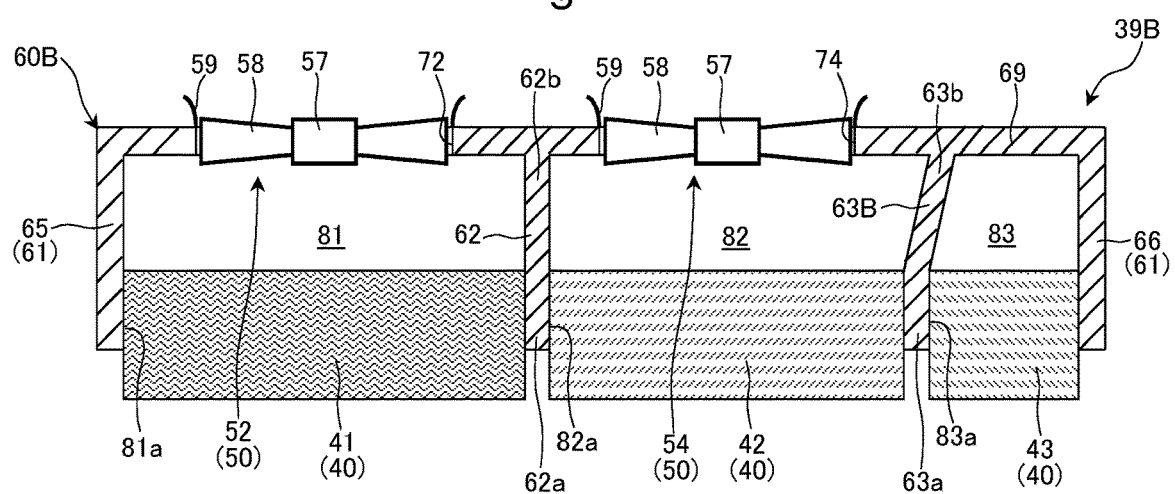
FIG. 14 is a schematic cross sectional view taken along a line corresponding to the line VII-VII of FIG. 4, depicting the cooling device for a construction machine according to the first modification of the second embodiment of the present invention.
Figure 15:
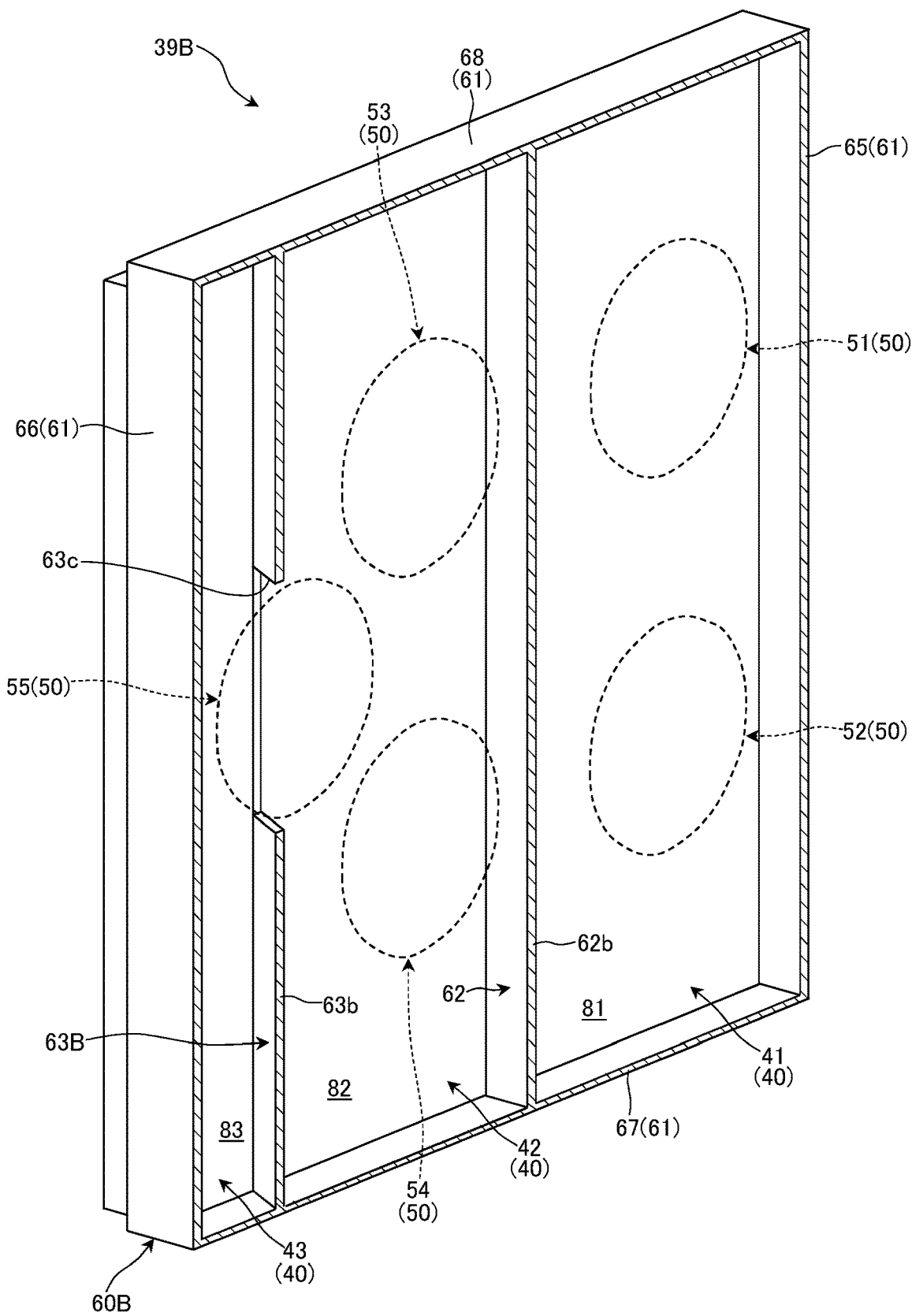
FIG. 15 is a schematic perspective view depicting an internal structure of a casing that is part of the cooling device for a construction machine according to the first modification of the second embodiment of the present invention depicted in FIGS. 12 to 14, in a partly omitted manner.

Now, cooling devices for a construction machine according to a first modification and a second modification of the second embodiment of the present invention are described with reference to the drawings. First, the first modification is described with reference to FIGS. 12 to 15. FIG. 12 is a schematic sectional view taken along a line corresponding to the line V-V of FIG. 4, depicting the cooling device for a construction machine according to the first modification of the second embodiment of the present invention. FIG. 13 is a schematic sectional view taken along a line corresponding to the line VI-VI of FIG. 4, depicting the cooling device for a construction machine according to the first modification of the second embodiment of the present invention. FIG. 14 is a schematic sectional view taken along a line corresponding to the line VII-VII of FIG. 4, depicting the cooling device for a construction machine according to the first modification of the second embodiment of the present invention. FIG. 15 is a schematic perspective view depicting an internal structure of a casing that configures part of the cooling device for a construction machine according to the first modification of the second embodiment of the present invention depicted in FIGS. 12 to 14, in a partly omitted manner. It is to be noted that, in FIGS. 12 to 15, the same characters as those in FIGS. 1 to 11 denote the same elements, and therefore, detailed description of them is omitted.

The cooling device 39B for a construction machine according to the first modification of the second embodiment of the present invention depicted in FIGS. 12 to 15 is different from that of the second embodiment in that the second baffle 63B is inclined such that the other side end portion 63b of the second baffle 63B (end portion on the cooling fan group 50 side) is displaced to the second side face portion 66 side of the peripheral wall 61 in the arrangement direction of the plurality of heat exchangers 41, 42, and 43 from the one side end portion 63a (end portion on the heat exchanger group 40 side). The disposition of the fifth fan 55 is determined by various restriction conditions such as the size of the fan, the size of the casing 60B, and disposition of various types of equipment around the cooling device 39B. Therefore, it is supposed that, when viewed from the one side toward the other side in the extending direction of the casing 60B, the fifth fan 55 cannot be disposed so as to straddle substantially equally between the radiator 42 and the intercooler 43 and cannot be avoided to be disposed at a position displaced to one of the radiator 42 side and the intercooler 43 side. Even with such disposition of the fifth fan 55, by inclining the second baffle 63B such that the other side end portion 63b of the second baffle 63B is offset from the one side end portion 63a, the fifth fan 55 can be disposed so as to straddle between both the second flow path 82 and the third flow path 83. It is to be noted that, although the inclined second baffle 63B in the present modification has the cutout 63c, also an alternative configuration that does not include the cutout 63c is possible.

Figure 16:
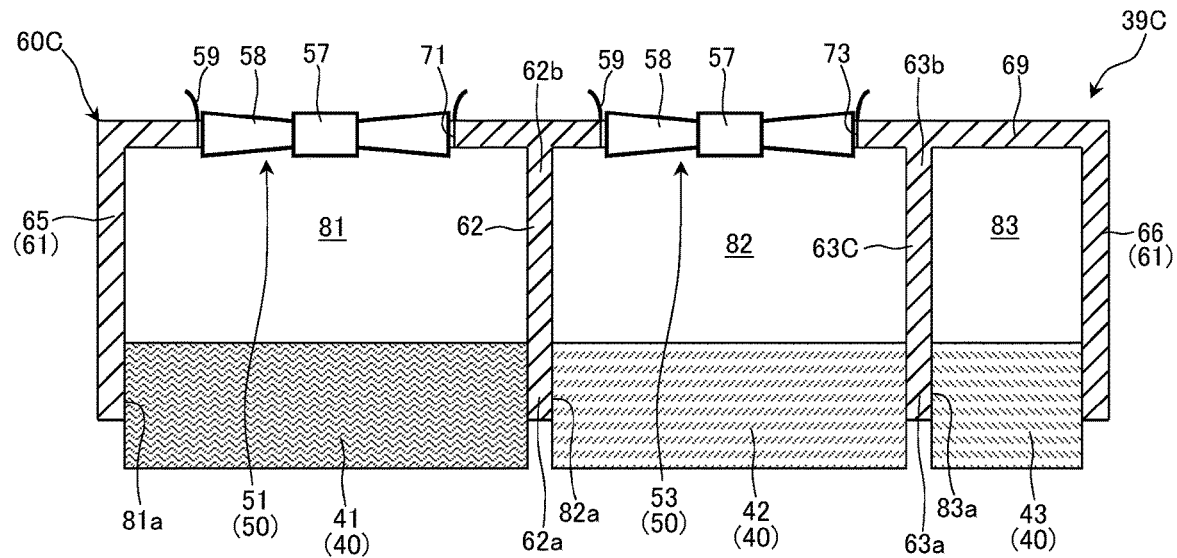
FIG. 16 is a schematic cross sectional view taken along a line corresponding to the line V-V of FIG. 4, depicting a cooling device for a construction machine according to a second modification of the second embodiment of the present invention.
Figure 17:
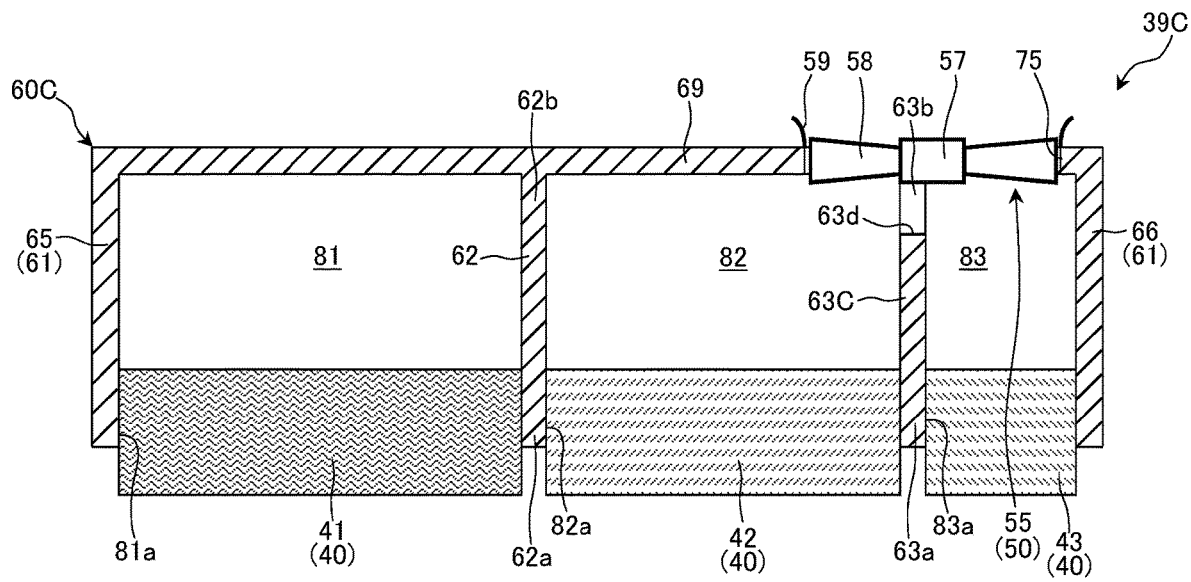
FIG. 17 is a schematic cross sectional view taken along a line corresponding to the line VI-VI of FIG. 4, depicting the cooling device for a construction machine according to a second modification of the second embodiment of the present invention.
Figure 18:
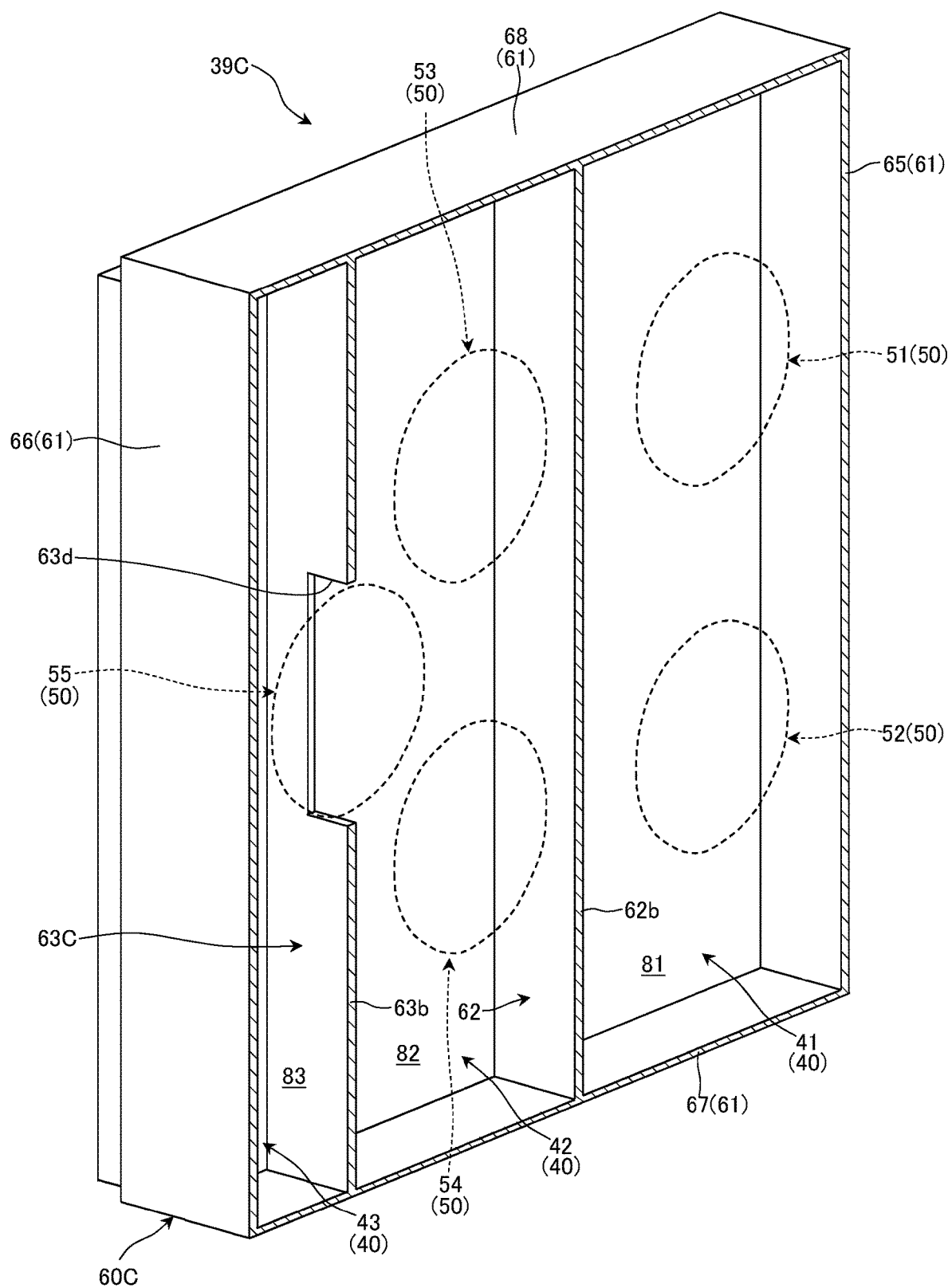
FIG. 18 is a schematic perspective view depicting an internal structure of a casing that is part of the cooling device for a construction machine according to a second modification of the second embodiment of the present invention depicted in FIGS. 16 to 17, in a partly omitted manner.

Now, the second modification is described with reference to FIGS. 16 to 18. FIG. 16 is a schematic sectional view taken along a line corresponding to the line V-V of FIG. 4, depicting the cooling device for a construction machine according to the second modification of the second embodiment of the present invention. FIG. 17 is a schematic sectional view taken along a line corresponding to the line VI-VI of FIG. 4, depicting the cooling device for a construction machine according to the second modification of the second embodiment of the present invention. FIG. 18 is a schematic perspective view depicting an internal structure of a casing that configures part of the cooling device for a construction machine according to the second modification of the second embodiment of the present invention depicted in FIGS. 16 to 17, in a partly omitted manner. It is to be noted that, in FIGS. 16 to 18, the same characters as those in FIGS. 1 to 15 denote the same elements, and therefore, detailed description of them is omitted.

In the cooling device 39C for a construction machine according to the second modification of the second embodiment of the present invention depicted in FIGS. 16 to 18, the depthwise dimension of the casing 60C is greater than that of the casing 60A (refer to FIG. 10) in the second embodiment and the distance between each of the heat exchangers 41, 42, and 43 and each of the cooling fans 51, 52, 53, 54, and 55 is greater than that in the case of the second embodiment. Further, the cutout 63d of the second baffle 63C is formed over a range from the position of the attachment wall 69 of the casing 60C to a position nearer to the fifth fan 55 side than the surface of the radiator 42 and the intercooler 43 (the other side end face in the extending direction of the peripheral wall 61). That is, the other side end portion 63b of the second baffle 63C on which the cutout 63*d* is provided extends to the fifth fan 55 side beyond the radiator 42 and the intercooler 43. The cutout 63*d* of the second baffle 63C in the present modification is smaller in regard to the formation range than the cutout 63*c* of the second baffle 63A in the second embodiment and the second baffle 63C is positioned closer to the fifth fan 55 side than the second baffle 63A.

Accordingly, the second baffle 63C according to the present modification is smaller in regard to the formation range of the cutout 63*d* than that in an alternative configuration (second baffle 63A in the second embodiment) in which a cutout that extends to the surface of each of the radiator 42 and the intercooler 43 (the other side end face in the extending direction of the peripheral wall 61), and cooling air generated by the third fan 53 and the fourth fan 54 can be prevented with certainty from flowing into the second flow path 82 via the intercooler 43 positioned on one side of the extending direction of the casing 60C by an amount by which the second baffle 63C extents to the fifth fan 55 side beyond the radiator 42 and the intercooler 43 and besides the guide function for cooling air can be demonstrated more readily. Thus, the distribution function of the amount of cooing air by the second baffle 63C can be maintained. That is, it is possible to adjust the distribution ratio of the amount of air of the fifth fan 55 to the second flow path 82 and the third flow path 83 with high accuracy according to the relative position of the fifth fan 55 and the other side end portion 63*b* of the second baffle 63C.

According to the cooling device for a construction machine according to the first modification and the second modification of the second embodiment of the present invention described above, as in the second embodiment described above, the amount of cooling air generated by the fifth fan 55 can be distributed to the mutually adjacent two flow paths 82 and 83 partitioned by the second baffle 63B or 63C. Therefore, the deviation of the load that occurs among the plurality of cooling fans 51, 52, 53, 54, and 55 can be reduced.

Further, according to the first modification, the second baffle 63B is inclined such that the other side end portion 63*b* thereof is offset in the arrangement direction of the plurality of heat exchangers 41, 42, and 43 from the one side end portion 63*a*. With this configuration, even if there is a restriction in the disposition of the fifth fan 55, the fifth fan 55 can be disposed so as to straddle between the second flow path 82 and the third flow path 83.

Meanwhile, in the second modification, the cutout 63*d* of the second baffle 63C is formed such that an end edge thereof on the one side end portion 63*a* side (heat exchanger group 40 side) is positioned closer to the fifth fan 55 than to the plurality of heat exchangers 41, 42, and 43. According to this configuration, the distribution ratio of the amount of air of the fifth fan 55 to the mutually adjacent flow paths 82 and 83 can be adjusted with higher accuracy according to the relative position of the fifth fan 55 and the other side end portion 63*b* of the second baffle 63C than that in an alternative configuration in which the cutout of the second baffle 63C extends to the positions of the heat exchangers 41, 42, and 43.

Third Embodiment

Figure 19:
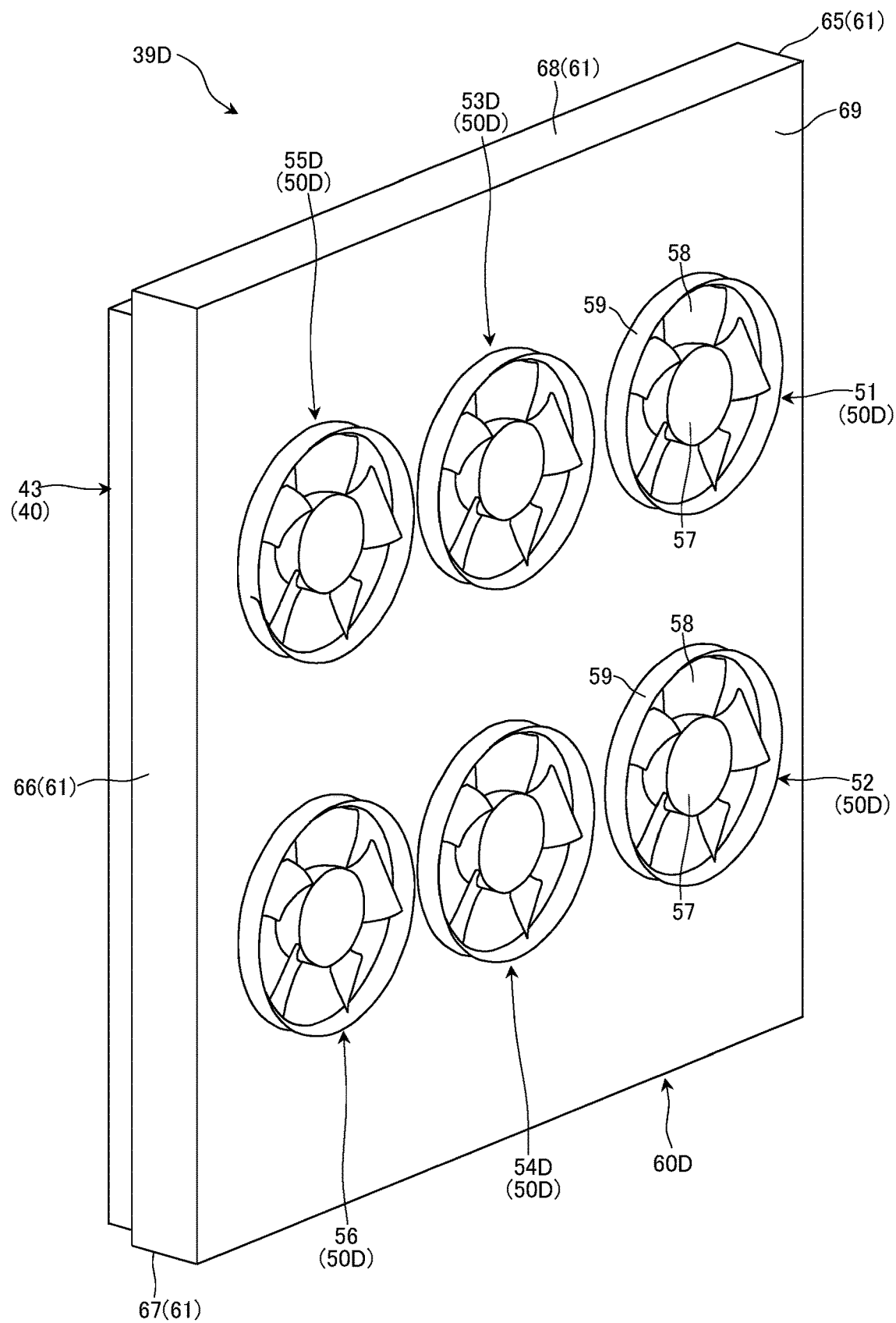
FIG. 19 is a perspective view of a cooling device for a construction machine according to a third embodiment of the present invention as viewed from the fan side.
Figure 20:
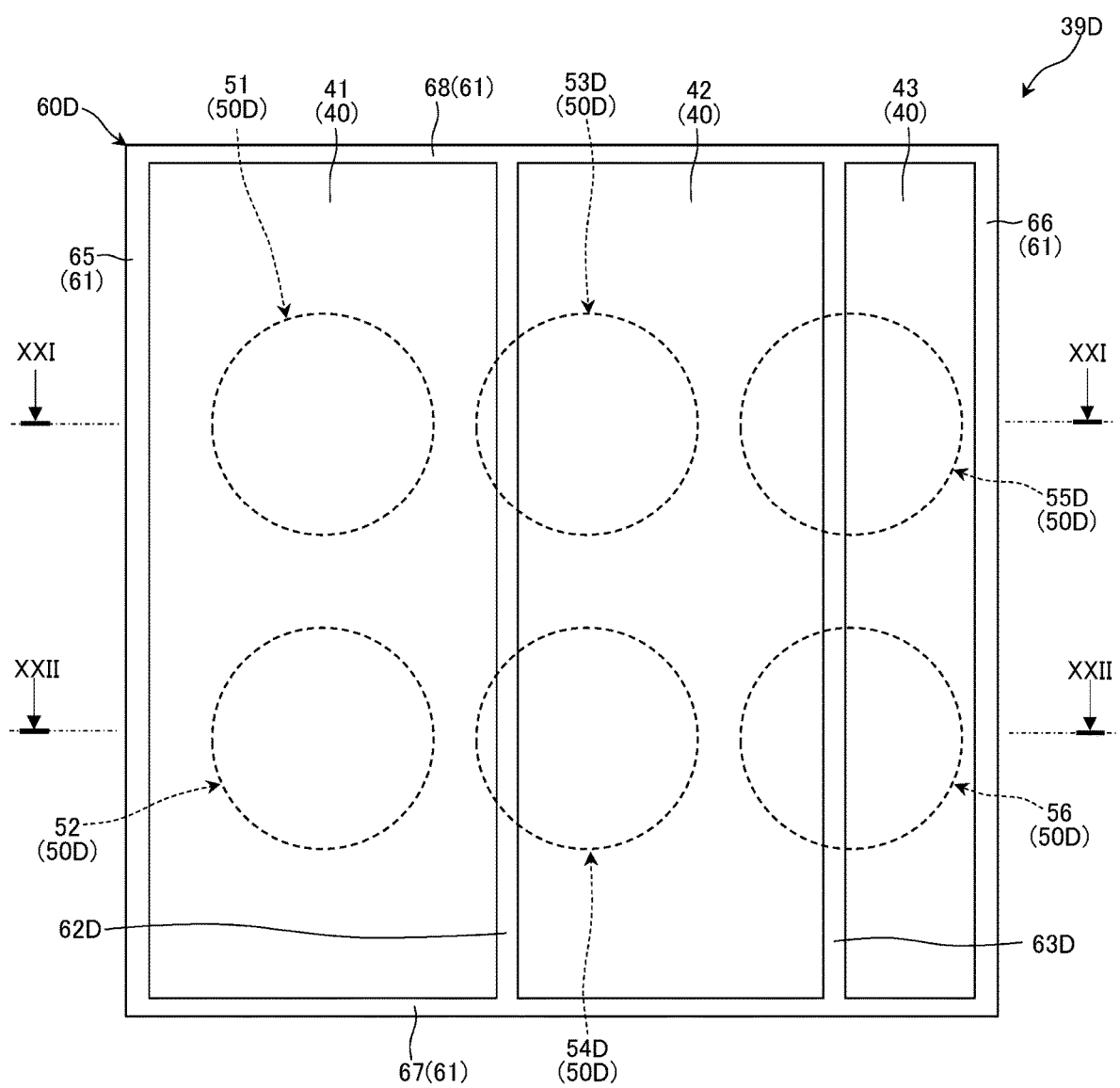
FIG. 20 is a front elevational view of the cooling device for a construction machine according to the third embodiment of the present invention as viewed from the heat exchanger side.
Figure 21:
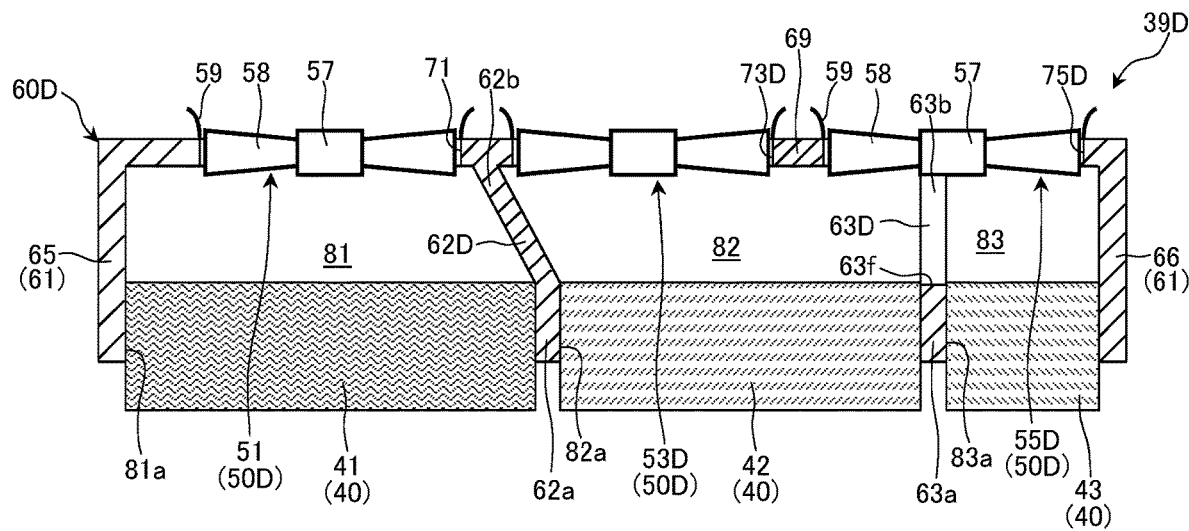
FIG. 21 is a schematic cross sectional view taken along a line corresponding to a line XXI-XXI, depicting the cooling device for a construction machine according to the third embodiment of the present invention depicted in FIG. 20.
Figure 22:
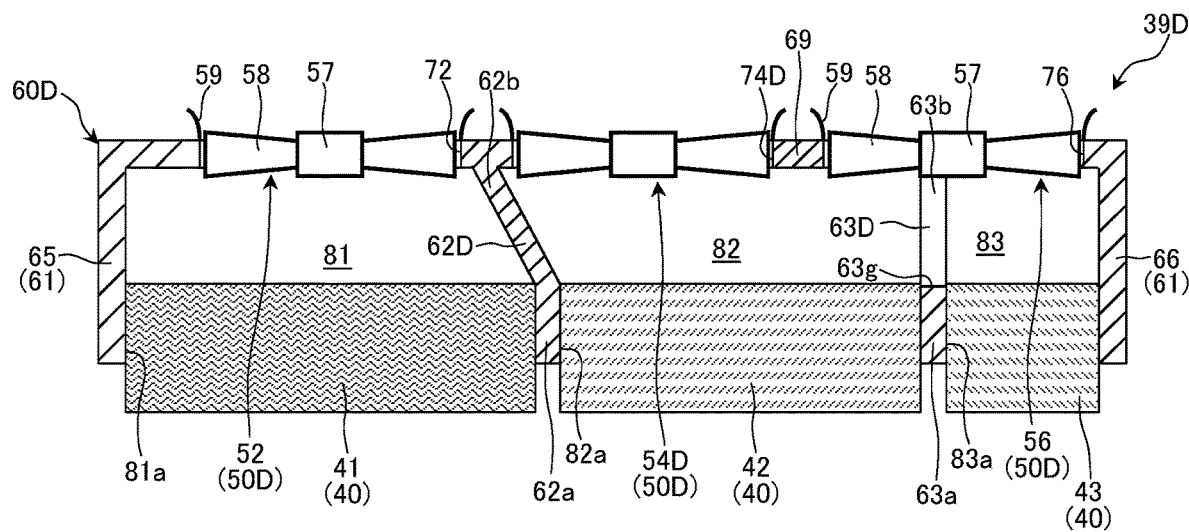
FIG. 22 is a schematic cross sectional view taken along a line corresponding to a line XXII-XXII, depicting the cooling device for a construction machine according to the third embodiment of the present invention depicted in FIG. 20.
Figure 23:
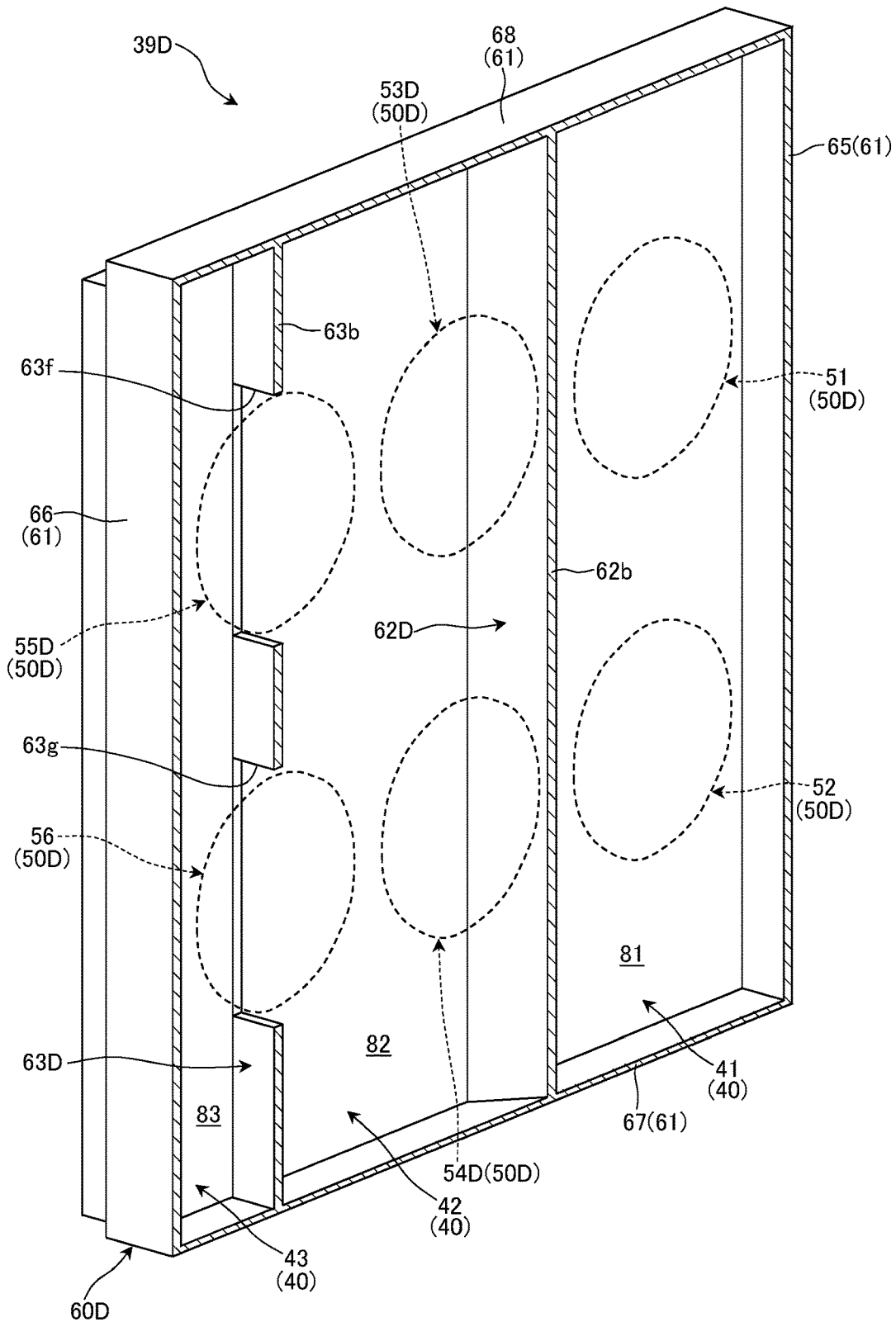
FIG. 23 is a schematic perspective view depicting an internal structure of a casing that is part of the cooling device for a construction machine according to the third embodiment of the present invention depicted in FIGS. 21 to 22 in a partly omitted manner.

Now, a cooling device for a construction machine according to a third embodiment of the present invention is described with reference to FIGS. 19 to 23. FIG. 19 is a perspective view of the cooling device for a construction machine according to the third embodiment of the present invention as viewed from the fan side. FIG. 20 is a front elevational view of the cooling device for a construction machine according to the third embodiment of the present invention as viewed from the heat exchanger side. FIG. 21 is a schematic sectional view taken along a line XXI-XXI, depicting the cooling device for a construction machine according to the third embodiment of the present invention depicted in FIG. 20. FIG. 22 is a schematic sectional view taken along a line XXII-XXII, depicting the cooling device for a construction machine according to the third embodiment of the present invention depicted in FIG. 20. FIG. 23 is a schematic perspective view depicting an internal structure of a casing that configures part of the cooling device for a construction machine according to the third embodiment of the present invention depicted in FIGS. 21 to 22, in a partly omitted manner. It is to be noted that, in FIGS. 19 to 23, the same characters as those in FIGS. 1 to 18 denote the same elements, and therefore, detailed description of them is omitted.

The cooling device 39D for a construction machine according to the third embodiment of the present invention supposes a case in which the heat exchange amount of the intercooler 43 is relatively greater than that in the case of the first embodiment. The present cooling device 39D is different from the cooling device 39 of the first embodiment mainly in that the cooling fan group 50D includes six fans, that the disposition of the fans differs depending upon the configuration of the cooling fan group 50D, and that the structures of the first baffle 62D and the second baffle 63D of the casing 60D differ depending upon the disposition of the fans.

In particular, as depicted in FIGS. 19 to 22, the cooling fan group 50D includes a first fan 51 and a second fan 52 for supplying cooling air mainly to the first heat exchanger 41, a third fan 53D and a fourth fan 54D for supplying cooling air mainly to the second heat exchanger 42, and a fifth fan 55D and a sixth fan 56 for supplying cooling air to both the second heat exchanger 42 and the third heat exchanger 43. The first fan 51 and the second fan 52 face the first heat exchanger 41 and are disposed being spaced from each other in the upward and downward direction, as in the first embodiment. The third fan 53D and the fourth fan 54D are disposed being spaced from each other in the upward and downward direction at a position at which, when viewed from one side (in FIGS. 21 and 22, lower side) toward the other side (in FIGS. 21 and 22, upper side) of the casing 60D, they overlap at most part thereof with the second head exchanger 42 and overlap at part thereof with the first heat exchanger 41. The fifth fan 55D and the sixth fan 56 are disposed being spaced from each other in the upward and downward direction at a position at which, when viewed from one side to the other side of the casing 60D, they straddle between the second heat exchanger 42 and the third heat exchanger 43. The first fan 51, the third fan 53D, and the fifth fan 55D are positioned substantially at the same position in the heightwise direction. Further, the second fan 52, the fourth fan 54D, and the sixth fan 56 are positioned substantially at the same position in the heightwise direction.

The first baffle 62D of the casing 60D is inclined such that the other side end portion 62*b* of the first baffle 62D is offset to the first side face portion 65 side of the peripheral wall 61 in the arrangement direction of the plurality of heat exchangers 41, 42, and 43 with respect to the one side end portion 62*a* as depicted in FIGS. 21 to 23.

In the attachment wall 69 of the casing 60D, a sixth attachment hole 76 is formed in addition to the first attachment hole 71 to the fifth attachment hole 75. The first attachment hole 71 and the second attachment hole 72 are positioned between the first side face portion 65 of the peripheral wall 61 and the other side end portion 62b of the first baffle 62D. That is, the first fan 51 and the second fan 52 are positioned within the range of the first flow path 81 (between the peripheral wall 61 and the first baffle 62D), and the first attachment hole 71 and the second attachment hole 72 constitute an outlet of the first flow path 81. The third attachment hole 73D and the fourth attachment hole 74D are positioned between the other side end portion 62b of the first baffle 62D and the other side end portion 63b of the second baffle 63D. That is, the third fan 53D and the fourth fan 54D are positioned within the range of the second flow path 82 (between the first baffle 62D and the second baffle 63D), and the third attachment hole 73D and the fourth attachment hole 74D constitute an outlet of the second flow path 82. The fifth attachment hole 75D and the sixth attachment hole 76 are formed so as to straddle the other side end portion 63b of the second baffle 63D. That is, the fifth fan 55D and the sixth fan 56 are opposed to the other side end portion 63b of the second baffle 63D and straddle between the second flow path 82 and the third flow path 83, and the fifth attachment hole 75D and the sixth attachment hole 76 constitute an outlet of both the second flow path 82 and the third flow path 83.

The second baffle 63D of the casing 60D has cutouts 63f and 63g at positions corresponding to the fifth fan 55D and the sixth fan 56 at the other side end portion 63b thereof. The cutouts 63f and 63g of the second baffle 63D are formed so as to extend from the position of the attachment wall 69 to the positions of the surface of the radiator 42 and the intercooler 43. The cutouts 63f and 63g of the second baffle 63 allow the casing 60D to hold the impellers of the fifth fan 55D and the sixth fan 56 inside the fifth attachment hole 75D and the sixth attachment hole 76 such that the impellers of the fifth fan 55D and the sixth fan 56 are not disposed outside the casing 60D.

In the cooling device 39D configured in such a manner as described above, an amount of air by approximately two fans is supplied to the first heat exchanger 41; an amount of air that is the sum of an amount of air by approximately two fans to which an amount of air by approximately 0.5 fans and an amount of air by approximately 0.5 fans are added, namely, an amount of air by approximately three fans, is supplied to the second heat exchanger 42; and an amount of air that is the sum of an amount of air by approximately 0.5 fans and an amount of air by approximately 0.5 fans, namely, an amount of air by approximately one fan, is supplied to the third heat exchanger 43. In short, in the present embodiment, the amount of air that is supplied to the intercooler 43 increases more than that in the case of the first embodiment.

In the present embodiment, the first baffle 62D is inclined such that the other side end portion 62b of the first baffle 62D (end portion of the cooling fan group 50D) is offset in the arrangement direction of the plurality of heat exchangers 41, 42, and 43 with respect to the one side end portion 62a (end portion of the heat exchanger group 40). According to the present configuration, even if there is a restriction to the disposition of the fans corresponding to the radiator 42, a necessary number of fans corresponding to the radiator 42 can be disposed within the range of the second flow path 82.

Further, in the present embodiment, the fifth fan 55D and the sixth fan 56 are disposed at positions at which they are opposed to the other side end portion 63b of the second baffle 63D. Accordingly, the fifth fan 55D and the sixth fan 56 that straddle between the second flow path 82 and the third flow path 83 suck the air from both regions of the region on the intercooler 43 side and the region on the radiator 42 side. Therefore, to the radiator 42 whose heat exchange amount is comparatively great, part of the amount of air of the fifth fan 55D and the sixth fan 56 is supplied in addition to the amount of air of the third fan 53D and the fourth fan 54D. Meanwhile, part of the amount of air of the fifth fan 55D and the sixth fan 56 is supplied to the intercooler 43 whose heat exchange amount is relatively small. Accordingly, by supplying part of the amount of air of the fifth fan 55D and the sixth fan 56 for compensation to the radiator 42 side, it is possible to obtain an amount of air necessary for both the radiator 42 and the intercooler 43 without increasing the amount of air of the third fan 53D and the fourth fan 54D.

Further, in the present embodiment, the second baffle 63D has the cutouts 63f and 63g at positions of the other side end portion 63b corresponding to the fifth fan 55D and the sixth fan 56. According to this configuration, disturbance or resistance, which is caused by the second baffle 63D, of the cooling air generated by the fifth fan 55D is reduced by the cutouts 63f and 63g provided on the second baffle 63D, and noise can be reduced.

According to the cooling device for a construction machine according to the third embodiment of the present invention described above, the amount of cooling air generated by the fifth fan 55D and the sixth fan 56 can be distributed to the two mutually adjacent flow paths 82 and 83 partitioned by the second baffle 63D, as in the first embodiment described hereinabove, so that the deviation of the load that occurs among the plurality of fans 51, 52, 53D, 54D, 55D, and 56 can be reduced, as in the first embodiment described hereinabove.

Fourth Embodiment

Figure 24:
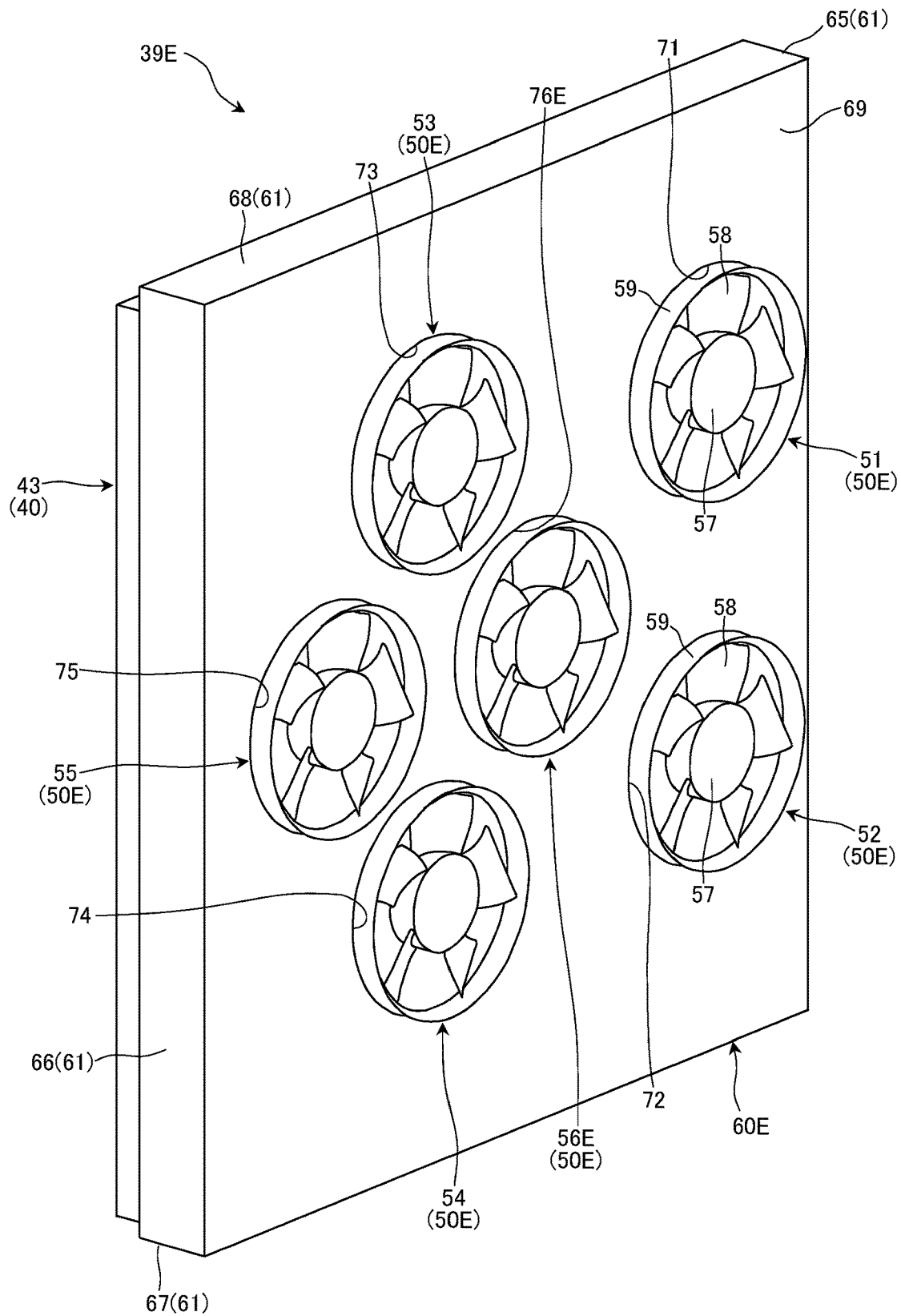
FIG. 24 is a perspective view of a cooling device for a construction machine according to a fourth embodiment of the present invention as viewed from the fan side.
Figure 25:
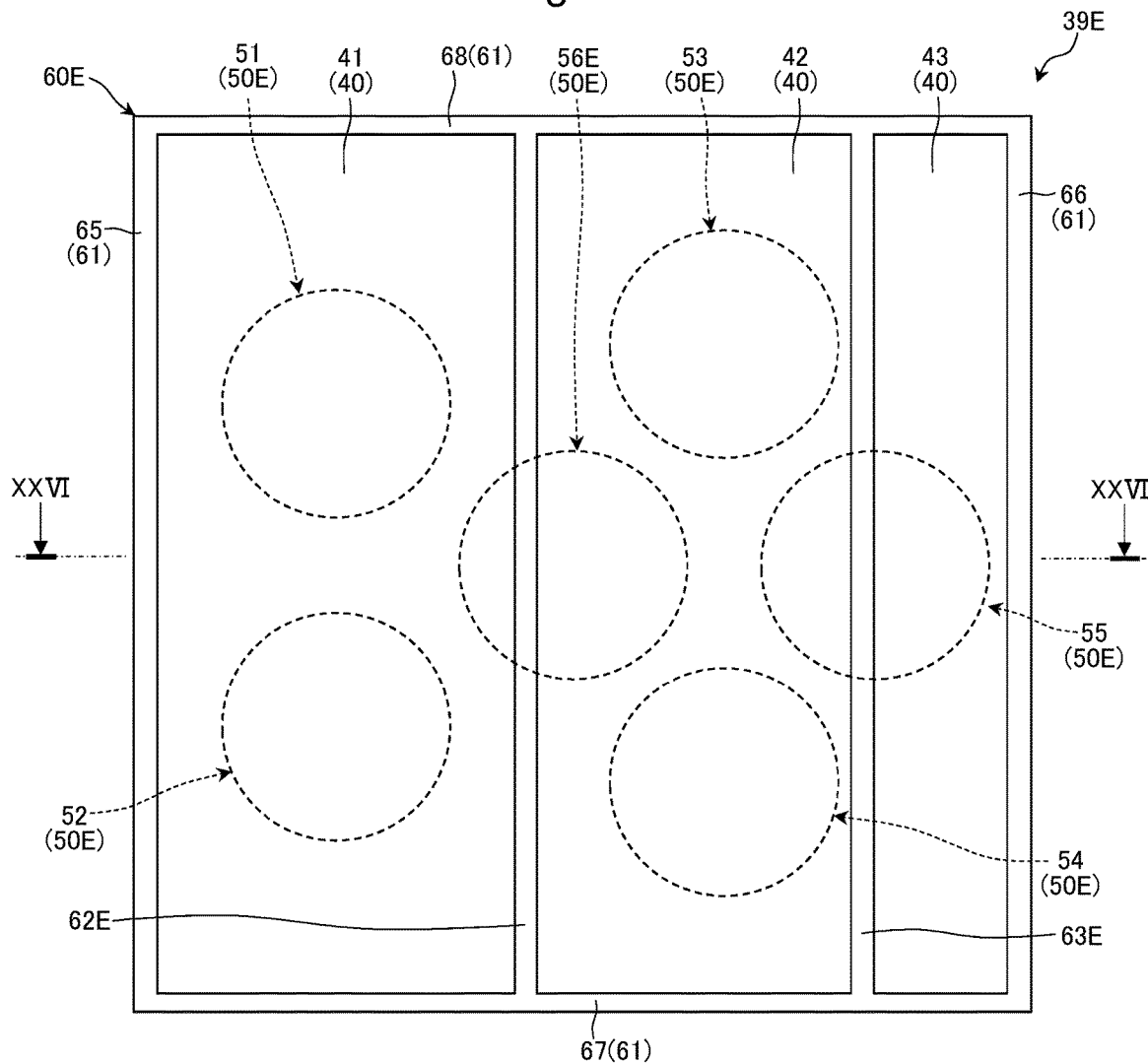
FIG. 25 is a front elevational view of the cooling device for a construction machine according to the fourth embodiment of the present invention as viewed from the heat exchanger side.
Figure 26:
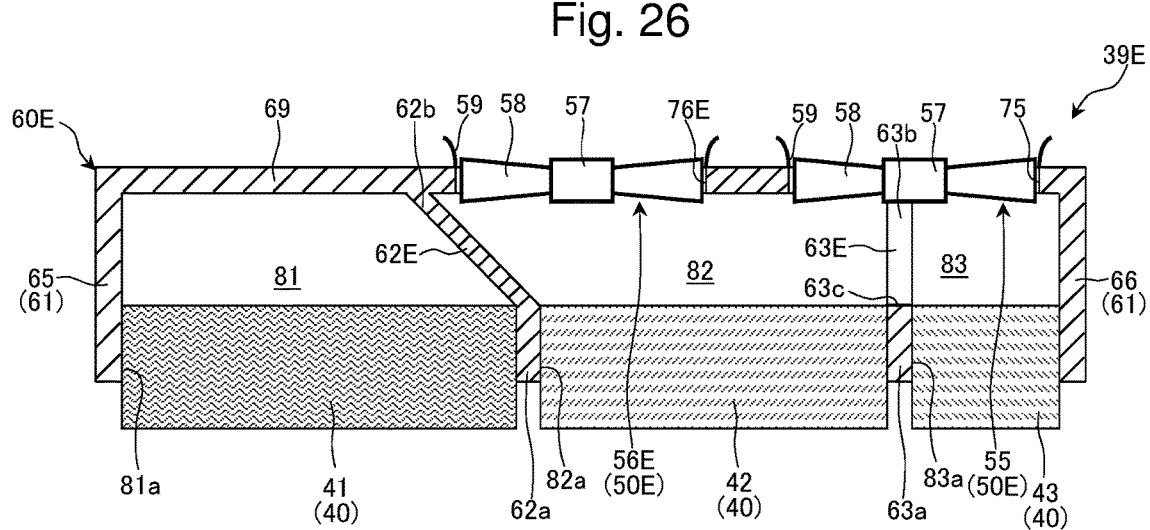
FIG. 26 is a schematic cross sectional view taken along a line XXVI-XXVI of the cooling device for a construction machine according to the fourth embodiment of the present invention depicted in FIG. 25.
Figure 27:
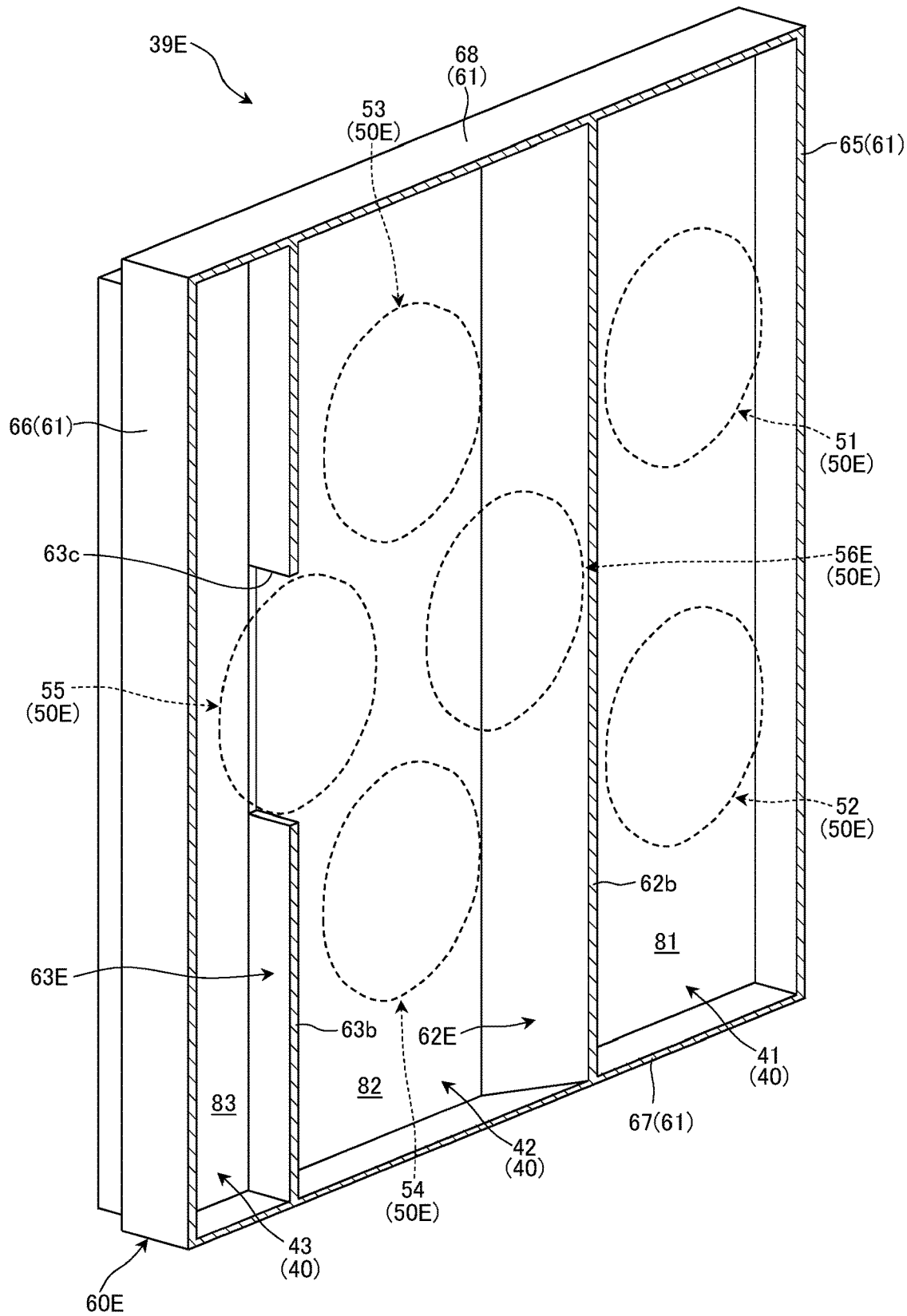
FIG. 27 is a schematic perspective view depicting an internal structure of a casing that is part of the cooling device for a construction machine according to the fourth embodiment of the present invention depicted in FIG. 26 in a partly omitted manner.

Now, a cooling device for a construction machine according to a fourth embodiment of the present invention is described with reference to FIGS. 24 to 27. FIG. 24 is a perspective view of the cooling device for a construction machine according to the fourth embodiment of the present invention as viewed from the fan side. FIG. 25 is a front elevational view of the cooling device for a construction machine according to the fourth embodiment of the present invention as viewed from the heat exchanger side. FIG. 26 is a schematic sectional view taken along a line XXVI-XXVI of the cooling device for a construction machine according to the fourth embodiment of the present invention depicted in FIG. 25. FIG. 27 is a schematic perspective view depicting an internal structure of a casing that configures part of the cooling device for a construction machine according to the fourth embodiment of the present invention depicted in FIG. 26, in a partly omitted manner. It is to be noted that, in FIGS. 24 to 27, the same characters as those in FIGS. 1 to 23 denote the same elements, and therefore, detailed description of them is omitted.

The cooling device 39E for a construction machine according to the fourth embodiment of the present invention supposes a case in which the heat exchange amount of the radiator 42 is relatively greater than that in the case of the first embodiment. The present cooling device 39E is different from the cooling device 39 of the first embodiment mainly in that the cooling fan group 50E includes six fans, that the disposition of the fans differs depending upon the configuration of the cooling fan group 50E, and that the structure of the first baffle 62E and the second baffle 63E of the casing 60E differs depending upon the configuration of the cooling fan group 50E.

In particular, as depicted in FIGS. 24 to 26, the cooling fan group 50E includes a first fan 51 and a second fan 52 for supplying cooling air mainly to the first heat exchanger 41, a third fan 53, a fourth fan 54, and a sixth fan 56E for supplying cooling air mainly to the second heat exchanger 42, and a fifth fan 55 for supplying cooling air to both the second heat exchanger 42 and the third heat exchanger 43. The first fan 51 and the second fan 52 face the first heat exchanger 41 and is disposed being spaced from each other in the upward and downward direction, as in the first embodiment. The third fan 53 and the fourth fan 54 face the second heat exchanger 42 and are disposed being spaced from each other in the upward and downward direction, as in the first embodiment. The fifth fan 55 is disposed so as to face the second heat exchanger 42 and the third heat exchanger 43 at such a position as to straddle between them and is positioned between the third fan 53 and the fourth fan 54 in the heightwise direction, as in the first embodiment. The sixth fan 56E is disposed at such a position as to overlap with (straddle) both the first heat exchanger 41 and the second heat exchanger 42 when viewed from one side (in FIG. 26, lower side) toward the other side (in FIG. 26, upper side) of the casing 60E. The position of the sixth fan 56E in the heightwise direction is between the third fan 53 and the fourth fan 54.

As depicted in FIGS. 24 and 26, the attachment wall 69 of the casing 60E has a sixth attachment hole 76E in addition to the first attachment hole 71 to the fifth attachment hole 75. The first attachment hole 71 and the second attachment hole 72 are positioned between the first side face portion 65 of the peripheral wall 61 and the other side end portion 62b of the first baffle 62E. In particular, the first fan 51 and the second fan 52 are positioned within the range of the first flow path 81 (between the first side face portion 65 of the peripheral wall 61 and the first baffle 62E), and the first attachment hole 71 and the second attachment hole 72 constitute an outlet of the first flow path 81. The third attachment hole 73, the fourth attachment hole 74 and the sixth attachment hole 76E are positioned between the other side end portion 62b of the first baffle 62E and the other side end portion 63b of the second baffle 63E. That is, the third fan 53, the fourth fan 54, and the sixth fan 56E are disposed so as to be positioned within the range of the second flow path 82 (between the first baffle 62E and the second baffle 63E), and the third attachment hole 73, the fourth attachment hole 74, and the sixth attachment hole 76E constitute an outlet of the second flow path 82. The fifth attachment hole 75 is formed at such a position as to straddle the other side end portion 63b of the second baffle 63E. That is, the fifth fan 55 is disposed so as to be opposed to the other side end portion 63b of the second baffle 63E and straddle between the second flow path 82 and the third flow path 83, and the fifth attachment hole 75 constitutes an outlet of both the second flow path 82 and the third flow path 83.

The first baffle 62E of the casing 60 is inclined such that the other side end portion 62b of the first baffle 62E (end portion of the cooling fan group 50E) is offset on the first side face portion 65 side of the peripheral wall 61 in the arrangement direction of the plurality of heat exchangers 41, 42, and 43 from the one side end portion 62a (end portion of the heat exchanger group 40), as depicted in FIG. 26. The second baffle 63E of the casing 60E has a cutout 63c at a position corresponding to the fifth fan 55 at the other side end portion 63b. The cutout 63c of the second baffle 63E is formed so as to extend from the position of the attachment wall 69 to the position of the surface of each of the second heat exchanger 42 and the third heat exchanger 43. The cutout 63c of the second baffle 63E allows the casing 60E to hold the impeller of the fifth fan 55 inside the casing 60E.

In the cooling device 39E configured in such a manner as described above, an amount of air by approximately two fans is supplied to the first heat exchanger 41; an amount of air by approximately 3.5 fans is supplied to the second heat exchanger 42; and an amount of air by approximately 0.5 fans is supplied to the third heat exchanger 43. That is, in the present embodiment, the amount of air supplied to the radiator 42 increases more than that in the case of the first embodiment.

According to the cooling device for a construction machine according to the fourth embodiment of the present invention described above, an amount of cooling air generated by the fifth fan 55 can be distributed to the two mutually adjacent flow paths 82 and 83 partitioned by the second baffle 63E, so that the deviation of the load that occurs among the plurality of fans 51, 52, 53, 54, and 55 can be reduced, as in the first embodiment described hereinabove.

Fifth Embodiment

Figure 28:
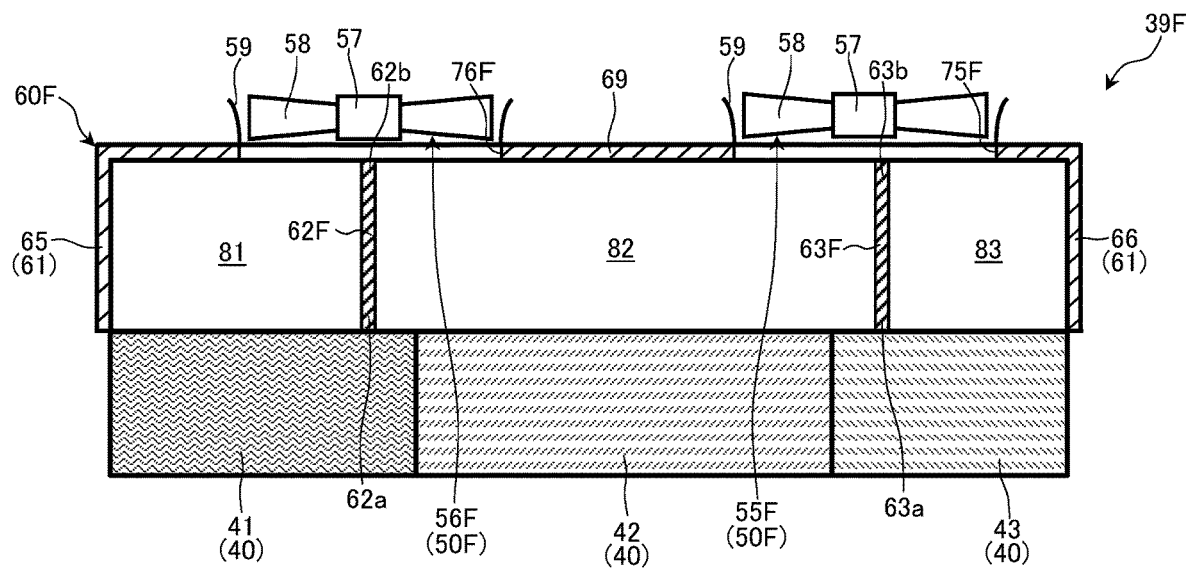
FIG. 28 is a schematic cross sectional view depicting a structure of a cooling device for a construction machine according to a fifth embodiment of the present invention.

Now, a cooling device for a construction machine according to a fifth embodiment of the present invention is described with reference to FIG. 28. FIG. 28 is a schematic sectional view depicting a structure of the cooling device for a construction machine according to the fifth embodiment of the present invention. It is to be noted that, in FIG. 28, the same characters as those in FIGS. 1 to 27 denote the same elements, and therefore, detailed description of them is omitted.

The cooling device 39F according to the fifth embodiment of the present invention depicted in FIG. 28 is different from that of the fourth embodiment mainly in that the structure of the casing 60F is different and that the relative position of the fifth fan 55F and the sixth fan 56F disposed at an intermediate position in the upward and downward direction among the first fan 51 to the sixth fan 56F of the cooling fan group 50F, the baffles 62F and 63F of the casing 60F, and the three heat exchangers 41, 42, and 43 may be different.

In particular, the casing 60F has, in addition to the peripheral wall 61 with a shape of an angular tube similar to that of the casing 60E in the fourth embodiment and the attachment wall 69 provided on the other side (in FIG. 28, upper side) in the extending direction of the peripheral wall 61, a first baffle 62F and a second baffle 63F arrayed in the arrangement direction of the three mutually parallel heat exchangers 41, 42, and 43 (transverse direction of the peripheral wall 61). The first baffle 62F and the second baffle 63F extend from the heat exchanger group 40 side (in FIG. 28, lower side) toward the cooling fan group 50F side in the space surrounded by the peripheral wall 61. More particularly, the first baffle 62F and the second baffle 63F are formed so as to extend in parallel to the first side face portion 65 and the second side face portion 66 of the peripheral wall 61. The first baffle 62F partitions the mutually adjacent first flow path 81 and second flow path 82, as in the fourth embodiment. The second baffle 63F partitions the mutually adjacent second flow path 82 and third flow path 83, as in the fourth embodiment.

The first baffle 62F is provided such that the one side end portion 62a, an end portion thereof on the heat exchanger group 40 side (in FIG. 28, lower side end portion), is positioned at an intermediate portion in the widthwise direction (in FIG. 28, leftward and rightward direction) on the oil cooler 41. That is, the one side end portion 62a of the first baffle 62F is disposed to be offset from the boundary between the mutually adjacent oil cooler 41 and radiator 42.

The second baffle 63F is provided such that the one side end portion 63a, an end portion thereof on the heat exchanger group 40 side (in FIG. 28, lower side end portion), is positioned at an intermediate portion in the widthwise direction (in FIG. 28, leftward and rightward direction) on the intercooler 43. That is, the one side end portion 63a of the second baffle 63F is disposed to be offset from the boundary between the mutually adjacent radiator 42 and intercooler 43.

The first flow path 81 of the casing 60F is configured as a flow path corresponding mainly to the oil cooler 41. The third flow path 83 is configured as a flow path corresponding mainly to the intercooler 43. The second flow path 82 is configured as a flow path corresponding to all of the oil cooler 41, the radiator 42, and the intercooler 43.

The fifth attachment hole 75F of the attachment wall 69 is formed so as to straddle the other side end portion 63b, an end portion of the second baffle 63F on the cooling fan group 50F side (in FIG. 28, upper side end portion), and constitutes an outlet of both the second flow path 82 and the third flow path 83. That is, the fifth fan 55F is disposed at such a position as to be opposed to the other side end portion 63b of the second baffle 63F and straddle the other side end portion 63b of the second baffle 63F and is configured so as to straddle between only both the mutually adjacent second flow path 82 and third flow path 83.

The sixth attachment hole 76F is formed so as to straddle the other side end portion 62b, an end portion of the first baffle 62F on the cooling fan group 50F side (in FIG. 28, upper side end portion), and constitutes an outlet of both the first flow path 81 and the second flow path 82. That is, the sixth fan 56F is disposed at such a position as to be opposed to the other side end portion 62b of the first baffle 62F and straddle the other side end portion 62b of the first baffle 62F and is configured so as to straddle between only both the mutually adjacent first flow path 81 and second flow path 82.

The fifth fan 55F is disposed at such a position as to overlap with (straddle) both the second heat exchanger 42 and the third heat exchanger 43, when viewed from one side (in FIG. 28, lower side) toward the other side (in FIG. 28, upper side) of the casing 60F, as in the case of the fourth embodiment. The sixth fan 56F is disposed at such a position as to overlap with (straddle) both the first heat exchanger 41 and the second heat exchanger 42, when viewed from one side (in FIG. 28, lower side) toward the other side (in FIG. 28, lower side) of the casing 60F, as in the case of the fourth embodiment.

In the cooling device 39F configured in such a manner as described above, the amount of suction air of the sixth fan 56F is distributed to the first flow path 81 and the second flow path 82 by the first baffle 62F, and the amount of suction air of the fifth fan 55F is distributed to the second flow path 82 and the third flow path 83 by the second baffle 63F. In the present embodiment, the amount of cooling air that passes the oil cooler 41 is the sum of the whole amount of air flowing in the first flow path 81 and part of the amount of air flowing in the second flow path 82. Further, the amount of cooling air that passes the radiator 42 is part of the amount of air flowing in the second flow path 82. The amount of cooling air that passes the intercooler 43 is the sum of the whole amount of air flowing in the third flow path 83 and part of the amount of air flowing in the second flow path 82.

According to the cooling device for a construction machine according to the fifth embodiment of the present invention described above, the amount of cooling air generated by the fifth fan 55F can be distributed to the two mutually adjacent flow paths 82 and 83 partitioned by the second baffle 63F, and the amount of cooling air generated by the sixth fan 56F can be districted to the two mutually adjacent flow paths 81 and 82 partitioned by the first baffle 62F, as in the fourth embodiment described hereinabove. Therefore, it is possible to reduce the deviation of the load that occurs among the plurality of fans 51, 52, 53, 54, 55F, and 56F.

Further, in the present embodiment, the one side end portion 62a of the first baffle 62F on the heat exchanger group 40 side is positioned on the oil cooler 41 (one of the heat exchangers) from among the plurality of heat exchangers 41, 42, and 43. The one side end portion 63a of the second baffle 63F on the heat exchanger group 40 side is positioned on the intercooler 43 (one of the heat exchangers) from among the plurality of heat exchangers 41, 42, and 43.

According to this configuration, the region in which the relative position of the plurality of flow paths 81, 82, and 83 of the casing 60F and the plurality of heat exchangers 41, 42, and 43 can be changed can be expanded in comparison with that in the case of the fourth embodiment in which the one side end portion 62a of the first baffle 62E on the heat exchanger group 40 side is disposed on the boundary between the mutually adjacent oil cooler 41 and radiator 42 or that in the case of the fourth embodiment in which the one side end portion 63a of the second baffle 63E on the heat exchanger group 40 side is disposed on the boundary between the mutually adjacent radiator 42 and intercooler 43. Accordingly, by changing the relative position of the plurality of flow paths 81, 82, and 83 with respect to the plurality of heat exchangers 41, 42, and 43 according to a relative difference in heat exchange amount among the plurality of heat exchangers 41, 42, and 43, it is possible to reduce the deviation of the load that occurs among the plurality of fans 51, 52, 53, 54, 55F, and 56F.

Sixth Embodiment

Figure 29:
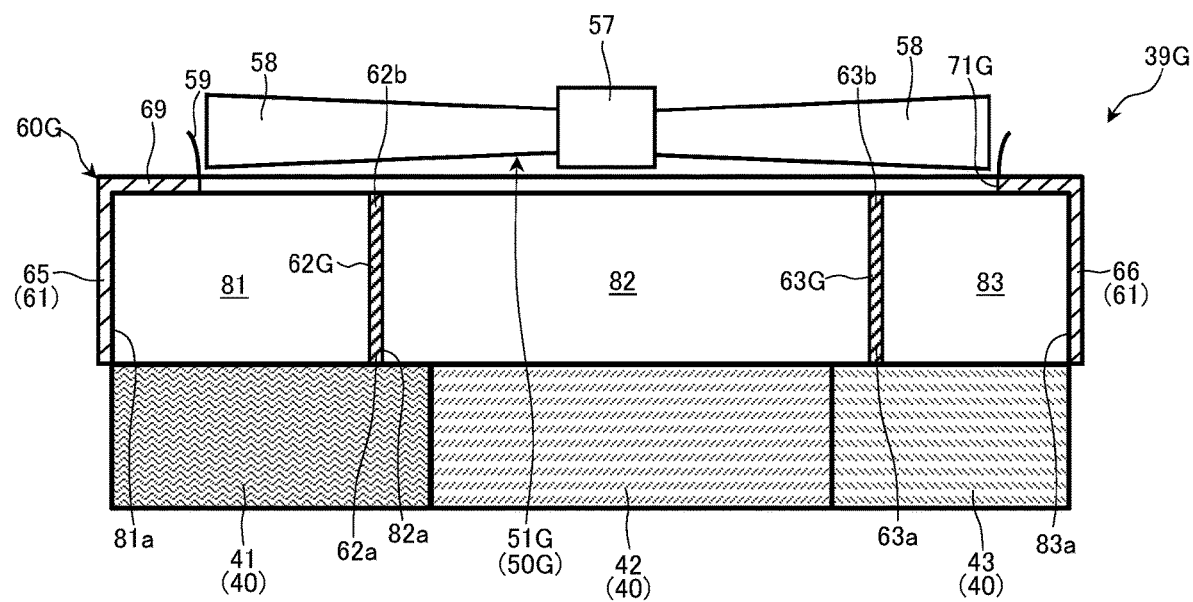
FIG. 29 is a schematic cross sectional view depicting a structure of a cooling device for a construction machine according to a sixth embodiment of the present invention.

Now, a cooling device for a construction machine according to a sixth embodiment of the present invention is described with reference to FIG. 29. FIG. 29 is a schematic sectional view depicting a structure of the cooling device for a construction machine according to the sixth embodiment of the present invention. It is to be noted that, in FIG. 29, since the same characters as those in FIGS. 1 to 28 denote the same elements, detailed description of them is omitted.

The cooling device 39G for a construction machine according to the sixth embodiment of the present invention depicted in FIG. 29 is different from that of the fifth embodiment mainly in that the configuration of the cooling fan group 50G is different and that the structure of the casing 60G differs depending upon the configuration of the cooling fan group 50G.

In particular, the cooling fan group 50G includes only one fan 51G. The fan 51G is capable of supplying an amount of air sufficient to cover the heat exchange amount of all of the plurality of heat exchangers 41, 42, and 43. The fan 51G is disposed at such a position as to overlap with (straddle) all of the plurality of heat exchangers 41, 42, and 43 when viewed from one side (in FIG. 29, lower side) toward the other side (in FIG. 29, upper side) of the casing 60G.

The casing 60G has, in addition to a peripheral wall 61 and an attachment wall 69 similar to that of the casing 60F in the fifth embodiment, a first baffle 62G and a second baffle 63G arrayed in the arrangement direction of the three parallel heat exchangers 41, 42, and 43 (transverse direction of the peripheral wall 61). The first baffle 62G extends from one side toward the other side (from the heat exchanger group 40 side to the fan 51G side) in the extending direction of the peripheral wall 61 in the space surrounded by the peripheral wall 61 and partitions the mutually adjacent first flow path 81 and second flow path 82, as in the fifth embodiment. The second baffle 63G extends from the one side to the other side in the extending direction of the peripheral wall 61 in the space surrounded by the peripheral wall 61 and partitions the mutually adjacent second flow path 82 and third flow path 83, as in the fifth embodiment.

The first baffle 62G is provided such that the one side end portion 62a, an end portion thereof on the heat exchanger group 40 side (in FIG. 29, lower side end portion), is positioned at an intermediate portion in the widthwise direction (in FIG. 29, leftward and rightward direction) on the oil cooler 41. That is, the one side end portion 62a of the first baffle 62G is disposed to be offset from the boundary between the mutually adjacent oil cooler 41 and radiator 42.

The second baffle 63G is provided such that the one side end portion 63a, an end portion thereof on the heat exchanger group 40 side (in FIG. 29, lower side end portion), is positioned at an intermediate portion in the widthwise direction (in FIG. 29, leftward and rightward direction) on the intercooler 43. That is, the one side end portion 63a of the second baffle 63G is disposed to be offset from the boundary between the mutually adjacent radiator 42 and intercooler 43.

One attachment hole 71G is provided for the one fan 51G in the attachment wall 69. The attachment hole 71G is formed in such a way as to straddle the other side end portion 62b that is an end portion of the first baffle 62G on the cooling fan group 50G side (in FIG. 29, upper side end portion) and the other side end portion 63b that is an end portion of the second baffle 63G on the cooling fan group 50G side (in FIG. 29, upper side end portion), and constitutes an outlet for all of the three flow paths 81, 82, and 83. That is, the fan 51G is disposed at such a position as to be opposed to the other side end portion 62b of the first baffle 62G and the other side end portion 63b of the second baffle 63F and straddle the other side end portion 62b of the first baffle 62G and the other side end portion 63b of the second baffle 63F. Thus, the fan 51G is configured so as to straddle all of the three flow paths 81, 82, and 83.

Incidentally, in general, a fan may cause a flow in a direction inclined with respect to a passing direction of cooling air for a heat exchanger on the side far from the suction position, while hardly causing a flow in an inclined direction due to the suction force of the fan on the side near to the suction position. For example, in the case of a configuration in which a baffle is not provided for the second flow path 182 as depicted in FIG. 9, a flow Fd in a direction (widthwise direction of the casing 160) inclined by a great amount with respect to the extending direction of the second flow path 182 (extending direction of the peripheral wall 61) is generated on one side in the extending direction of the casing 160 (side far from the suction position) by the fans 53 and 54. Even if a baffle is provided on the upstream side of the heat exchangers 41, 42, and 43, since the baffle is positioned on the side far from the suction position of the fans 53 and 54, the amount of cooling air generated by the fans 53 and 54 is not necessarily distributed appropriately to the heat exchangers 41, 42, and 43.

In contrast, in the present embodiment, since the casing 60G having the plurality of flow paths 81, 82 and 83 is provided between the plurality of heat exchangers 41, 42 and 43 and the single fan 51G, adjusting the relative position of the fan 51G and the plurality of flow paths 81, 82, and 83 makes it possible to accurately adjust the distribution of the amount of cooling air generated by the fan 51G to the flow paths 81, 82, and 83. Accordingly, the amount of cooling air that passes the plurality of heat exchangers 41, 42, and 43 positioned immediately on the upstream side of the plurality of flow paths 81, 82, and 83 can be distributed appropriately.

As described above, the cooling device 39G for a construction machine according to the sixth embodiment of the present invention includes the casing 60G having the peripheral wall 61, the plurality of heat exchangers 41, 42, and 43 disposed side by side so as to extend transversely in the casing 60G, and the single fan 51G that is disposed to be opposed to the plurality of heat exchangers 41, 42, and 43 and generates cooling air for the plurality of heat exchangers 41, 42, and 43 such that the suction side of the single fan 51G is the heat exchanger group 40 side. The casing 60G has the plurality of baffles 62G and 63G extending from the heat exchanger group 40 side toward the fan 51G side in the space surrounded by the peripheral wall 61 and arrayed in the arrangement direction of the plurality of heat exchangers 41, 42, and 43.

According to this configuration, the plurality of flow paths 81, 82, and 83 are formed between the plurality of heat exchangers 41, 42, and 43 and the single fan 51G by the peripheral wall 61 and the plurality of baffles 62G and 63G, so that it is possible to accurately adjust the distribution of the amount of cooling air generated by the single fan 51G to the flow paths 81, 82, and 83.

Accordingly, in comparison with an alternative configuration in which a plurality of flow paths are not formed between the plurality of heat exchangers 41, 42, and 43 and the fan 51G, it is possible to appropriately distribute the amount of cooling air that passes the heat exchangers 41, 42, and 43 positioned immediately on the upstream side of the plurality of flow paths 81, 82, and 83.

Further, in the present embodiment, the first baffle 62G of the casing 60G is provided such that the one side end portion 62a thereof is positioned on the oil cooler 41 (one of the heat exchangers) from among the plurality of heat exchangers 41, 42, and 43. Further, the second baffle 63G of the casing 60G is provided such that the one side end portion 63a thereof is positioned on the intercooler 43 (one of the exchangers) from among the heat exchangers 41, 42, and 43.

According to this configuration, in comparison with the case of the fourth embodiment in which the one side end portion 62a of the first baffle 62E is disposed on the boundary between the mutually adjacent oil cooler 41 and radiator 42 and the case of the fourth embodiment in which the one side end portion 63a of the second baffle 63E is disposed on the boundary between the mutually adjacent radiator 42 and intercooler 43, the region in which the relative position of the plurality of flow paths 81, 82, and 83 of the casing 60G and the plurality of heat exchangers 41, 42, and 43 can be changed can be expanded. Accordingly, changing the relative position of the plurality of flow paths 81, 82, and 83 with respect to the plurality of heat exchangers 41, 42, and 43 according to a difference in relative heat exchange amount among the plurality of heat exchangers 41, 42, and 43, makes it easy to adjust the amount of cooing air that passes the heat exchangers 41, 42, and 43.

Other Embodiments

It is to be noted that the present invention is not limited to the embodiments described above and includes various modifications. The embodiments described above have been explained in detail in order to describe the present invention in a way easy to understand and are not necessarily restricted to those that include all configurations described hereinabove. It is possible to replace part of the configuration of a certain embodiment with a configuration of a different embodiment, and also it is possible to add a configuration of a certain embodiment to the configuration of another embodiment. Also, it is possible to add, delete, or replace another configuration in regard to part of the configuration of each embodiment.

For example, in the description of the first to sixth embodiments and the modifications described above, the example in which the present invention is applied to the cooling devices 39, 39A, 39B, 39C, 39D, 39E, 39F, and 39G of the hydraulic excavator 1 is described, and the present invention can be applied widely to cooling devices for various types of construction machines such as a hydraulic crane or a wheel loader.

Further, while the embodiments described above indicate the example in which an electric motor is used as the driving device for each fan in the cooling fan groups 50, 50D, 50E, 50F, and 50G, it is also possible to use a hydraulic motor or the like as the driving device.

Further, the first to fifth embodiments described above indicate the example of the configuration in which a plurality of fans in each of the cooling fan group 50, 50D, 50E, and 50F all have the same specifications. However, a plurality of fans constituting any cooling fan group may also be configured such that the specifications of the shape, size, and the like differ depending upon various conditions such as the installation space and price.

Further, the first to fourth embodiments described hereinabove indicate the example of the configuration in which the cooling devices 39, 39A, 39B, 39C, 39D, and 39E include three heat exchangers of the oil cooler 41, the radiator 42, and the intercooler 43 and the casings 60, 60A, 60B, 60C, 60D, and 60E have the three flow paths 81, 82, and 83 corresponding to the three heat exchangers. However, the present invention allows for a configuration in which the cooling device includes at least two heat exchangers and the casing has flow paths equal to the number of heat exchangers. In this case, the number of baffles is set according to the number of flow paths of the casing. For example, when the number of heat exchangers is two, since the number of flow paths of the casing is two, the necessary number of baffles of the casing is one.

Further, the fifth embodiment described hereinabove indicates the example of the configuration in which the one side end portion 62a of the first baffle 62F of the casing 60F is disposed to be offset from the boundary between the mutually adjacent oil cooler 41 and radiator 42 and indicates the example of the configuration in which the one side end portion 63a of the second baffle 63F is disposed to be offset from the boundary between the mutually adjacent radiator 42 and intercooler 43. However, such a configuration is also possible that any one of the one side end portion 62a of the first baffle and the one side end portion 63a of the second baffle is disposed on the boundary between the mutually adjacent heat exchangers 41 and 42 or the mutually adjacent heat exchangers 42 and 43, as in the case of the first to fourth embodiments.

Further, the sixth embodiment described above indicates the example of the configuration in which the one side end portion 62a of the first baffle 62G of the casing 60G is disposed to be offset from the boundary between the mutually adjacent oil cooler 41 and radiator 42 and indicates the example of the configuration in which the one side end portion 63a of the second baffle 63G is disposed to be offset from the boundary between the mutually adjacent radiator 42 and intercooler 43. However, it is also possible to apply a configuration in which the one side end portion 62a of the first baffle and the one side end portion 63a of the second baffle are positioned on the boundaries between mutually adjacent ones of the heat exchangers 41, 42, and 43, as in the case of the first to fourth embodiments. That is, the plurality of heat exchangers 41, 42, and 43 are disposed in the openings 81a, 82a, and 83a on one side of the flow paths in a one-by-one corresponding relation to the plurality of flow paths 81, 82, and 83 of the casing. According to this configuration, it is possible to make the amounts of cooling air that flows in the flow paths 81, 82, and 83 and the amounts of cooling air that passes the heat exchangers 41, 42, and 43 substantially coincide with each other in a one-by-one corresponding relation.

DESCRIPTION OF REFERENCE CHARACTERS

1: Hydraulic excavator (construction machine)
39, 39A, 39B, 39C, 39D, 39E, 39F, 39G: Cooling device
41: Oil cooler (heat exchanger)
42: Radiator (heat exchanger)
43: Intercooler (heat exchanger)
51: First fan (fan, second fan)
51G: Single fan
52: Second fan (fan, second fan)
53, 53D: Third fan (fan, second fan)
54, 54D: Fourth fan (fan, second fan)
55, 55D, 55F: Fifth fan (fan, first fan)
56: Sixth fan (fan, first fan)
56E, 56F: Sixth fan (fan, second fan)
60, 60A, 60B, 60C, 60D, 60E, 60F, 60G: Casing
61: Peripheral wall
62, 62D, 62E, 62F, 62G: First baffle (baffle)
62a: One side end portion (end portion on heat exchanger side)
62b: Other side end portion (end portion on fan side)
63, 63A, 63B, 63C, 63D, 63E, 63F, 63G: Second baffle (baffle)
63a: One side end portion (end portion on heat exchanger side)
63b: Other side end portion (end portion on fan side)
63c, 63d, 63f, 63g: Cutout

The invention claimed is:

1. A cooling device for a construction machine, comprising:
a casing having a peripheral wall;
a plurality of heat exchangers disposed side by side so as to extend transversely in the casing; and
a plurality of fans disposed to be opposed to the plurality of heat exchangers, the plurality of fans being configured to generate cooling air for the plurality of heat exchangers such that a suction side of the plurality of fans is a heat exchanger side, wherein
the casing has a plurality of baffles extending from the heat exchanger side toward a fan side in a space surrounded by the peripheral wall, the plurality of baffles being arrayed in an arrangement direction of the plurality of heat exchangers,
an end portion of each of the plurality of baffles on the heat exchanger side is positioned on a boundary between two mutually adjacent heat exchangers from among the plurality of heat exchangers or is positioned on any one of the plurality of heat exchangers, a certain baffle among the plurality of baffles is provided with a cutout, the cutout being formed from an end portion of the certain baffle on the fan side toward the heat exchanger side, an end portion of the certain baffle on the heat exchanger side is positioned on a boundary between two mutually adjacent heat exchangers from among the plurality of heat exchangers, the plurality of fans include a first fan and a second fan;

the second fan is disposed at a position between the peripheral wall and a baffle adjacent to the peripheral wall from among the plurality of baffles or at a position between the plurality of baffles, and the first fan is opposed to and straddles adjacent heat exchangers from among the plurality of heat exchangers, and is disposed within the cutout.

2. The cooling device for a construction machine according to claim 1, wherein the cutout is formed such that an end edge of the cutout on the heat exchanger side is positioned closer to the first fan than to the plurality of heat exchangers.

3. The cooling device for a construction machine according to claim 1, wherein a baffle among the plurality of baffles is inclined such that an end portion of the baffle on the fan side is offset in the arrangement direction of the plurality of heat exchangers from an end portion of the baffle on the heat exchanger side.

* * * * *